US012625919B2

(12) United States Patent
Zhou et al.

(10) Patent No.: US 12,625,919 B2
(45) Date of Patent: May 12, 2026

(54) GENERATING AND PROCESSING SUMMARIES OF SEARCH RESULTS USING A LANGUAGE MODEL

(71) Applicant: Microsoft Technology Licensing, LLC, Redmond, WA (US)

(72) Inventors: Siyu Zhou, Campbell, CA (US); Xin Jin, Seattle, WA (US); Tong Wang, Kirkland, WA (US); Mi Yan, Bellevue, WA (US); Subhojit Som, Bellevue, WA (US); Katherine Gu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/654,437

(22) Filed: May 3, 2024

(65) Prior Publication Data

US 2025/0342218 A1 Nov. 6, 2025

(51) Int. Cl.
*G06F 16/957* (2019.01)
*G06F 3/04812* (2022.01)
*G06F 16/954* (2019.01)

(52) U.S. Cl.
CPC ...... *G06F 16/9574* (2019.01); *G06F 3/04812* (2013.01); *G06F 16/954* (2019.01); *G06F 16/9577* (2019.01)

(58) Field of Classification Search
CPC . G06F 16/9574; G06F 16/9577; G06F 16/954
USPC .......................................................... 707/722
See application file for complete search history.

(56) References Cited

U.S. PATENT DOCUMENTS

| | | | | |
|---|---|---|---|---|
| 10,503,792 B1 * | 12/2019 | Frieder | ............... | G06F 12/0871 |
| 11,769,017 B1 * | 9/2023 | Gray | ....................... | G06F 40/56 704/9 |
| 12,008,332 B1 * | 6/2024 | Gardner | ................ | G06F 16/345 |
| 2010/0205213 A1 * | 8/2010 | Broder | .............. | G06Q 30/0251 711/E12.017 |
| 2024/0256582 A1 * | 8/2024 | Jain | ..................... | G06F 16/3329 |
| 2025/0272321 A1 * | 8/2025 | Cui | ....................... | G06F 16/334 |

OTHER PUBLICATIONS

English Translation of CN115346626A titled Sample analysis system and sample information search method. Nov. 15, 2022. 17 pages. (Year: 2022).*

* cited by examiner

*Primary Examiner* — Kimberly L Wilson
(74) *Attorney, Agent, or Firm* — Shook, Hardy & Bacon L.L.P.

(57) ABSTRACT

Technology is disclosed for programmatically generating a summary by a language model of search results based on the corresponding relevance of the search results to an input search query to a search engine. A user inputs a search query into a search engine and the search engine determines and ranks a set of search results based on the relevance of each of the search results. A snippet of information is determined for the most relevant search results to the input search query. The snippets of information are used to generate an input prompt to a language model with an instruction to generate a summary of the snippets of information based on the input search query. The generated summary is provided in response to the user to the search query and/or is cached in order to provide the generated summary in response to similar search queries.

17 Claims, 13 Drawing Sheets

300A

Q what do I need to travel  🎤  📷

( Q Search )  ( ☐ Copilot )  ( Work )  ( Flights )  ( Images )  ( Videos )  ( Maps )  ( News )  ⋮

Also try:  ( things to have when traveling )  ( things you need to travel )  ( want travel )

About 4,520,000 results

To travel, you need to ①②③④:
- Have a printed itinerary and a copy of your passport, credit card, and bank contacts ①③
- Check if your destination has travel restrictions and entry requirements, and obtain the necessary documents, such as a passport and visas②③④
- Book your travel far in advance and avoid hidden fees②
- Pack your personal toiletries, prescription medications, and a set of comfy clothes ①
- Plan your ground transportation at your destination ①
- Take out cash and call your bank to inform them of your travel①
- Bring a bottle of water and some snacks ①
- Arrive at the airport at least 3 hours before your scheduled departure time ④

Learn more:  ⓘ

| ① ⃝ | The Ultimate Travel Checklist You Nee... ☐ rd.com | ② | Here's Everything You Need to Travel the Worl... ☐ time.com | ③ ⃝ | The Only Travel Packing Checkli ☐ smartertravel.c... | ⟩ |

( How do I avoid scams? )  ( How do I find cheap flights? )  ( What are some travel tips? )  ⟩

( 💬 Type a message...  🎤  ➤ )

Feedback 👍 👎

SEARCH RESULTS

⟩
⟩

⟩

⟩
⟩
⟩
⟩

⟩
⟩

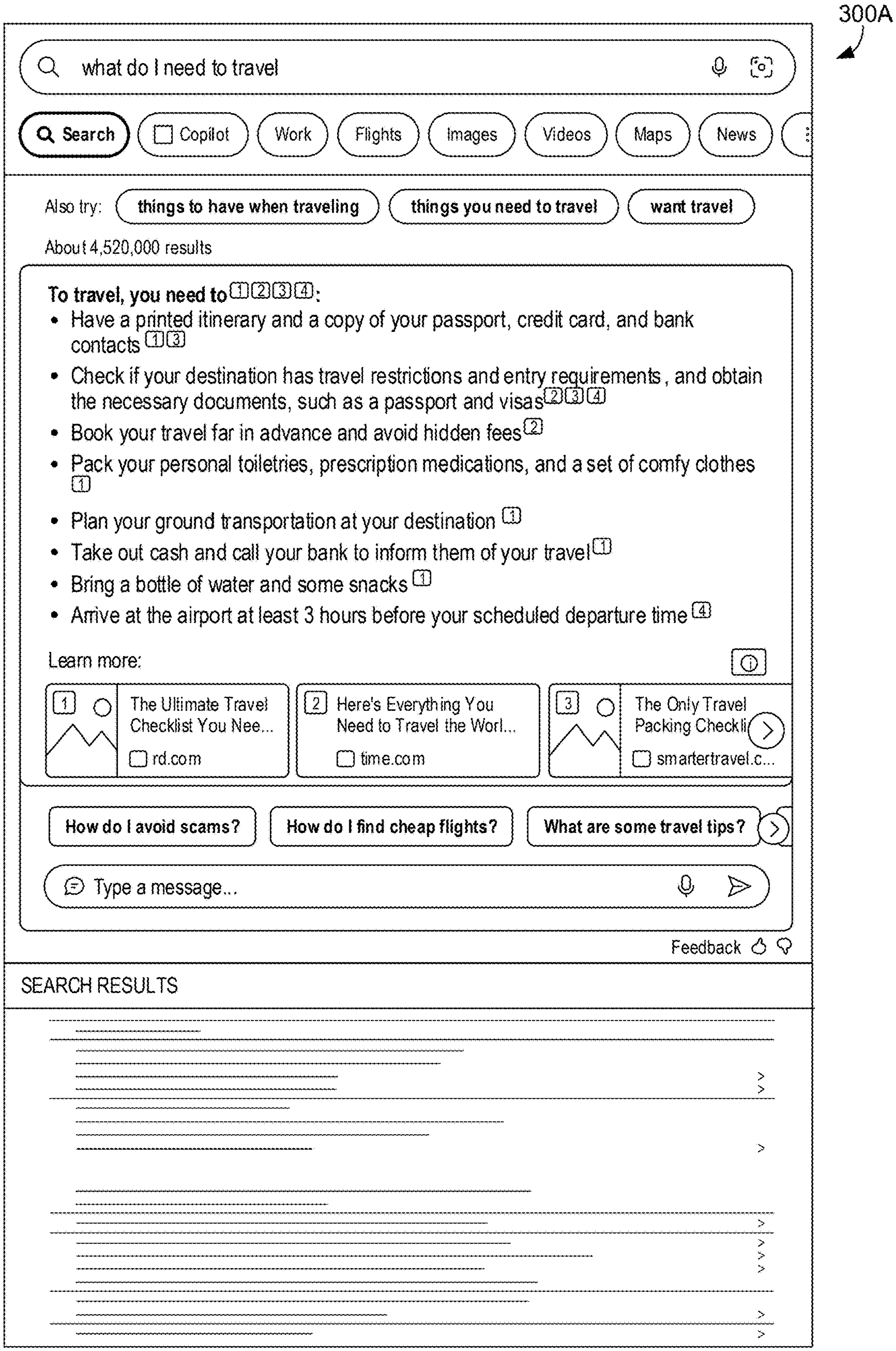

Q   what do I need to travel      🎤 📷

Q Search    ☐ Copilot    Work    Flights    Images    Videos    Maps    News   ⋮

Also try:   things to have when traveling    things you need to travel    want travel About 4,520,000 results To travel, you need to ①②③④:

The Ultimate Travel Checklist You Need Before Your Next Trip
https://www.rd.com/list/travel-checklist-essentials/

Here's Everything You Need to Travel the World | Time
https://time.com/5166659/how-to-travel-the-world/

The Only Travel Packing Checklist You'll Ever Need | SmarterTravel
https://www.smartertravel.com/the-ultimate-packing-list/

International travel – Travel information – American Airlines
https://www.aa.com/i18n/travel-info/international-travel/international-travel.jsp , and bank ements, and obtain et of comfy clothes

- Arrive at the airport at least 3 hours before your scheduled departure time ④

Learn more:            ⓘ

| ① The Ultimate Travel Checklist You Nee... ☐ rd.com | ② Here's Everything You Need to Travel the Worl... ☐ time.com | ③ The Only Travel Packing Checkli ☐ smartertravel.c... ❯ |

How do I avoid scams?    How do I find cheap flights?    What are some travel tips? ❯

☺ Type a message...      🎤 ➤

Feedback 👍 👎

SEARCH RESULTS

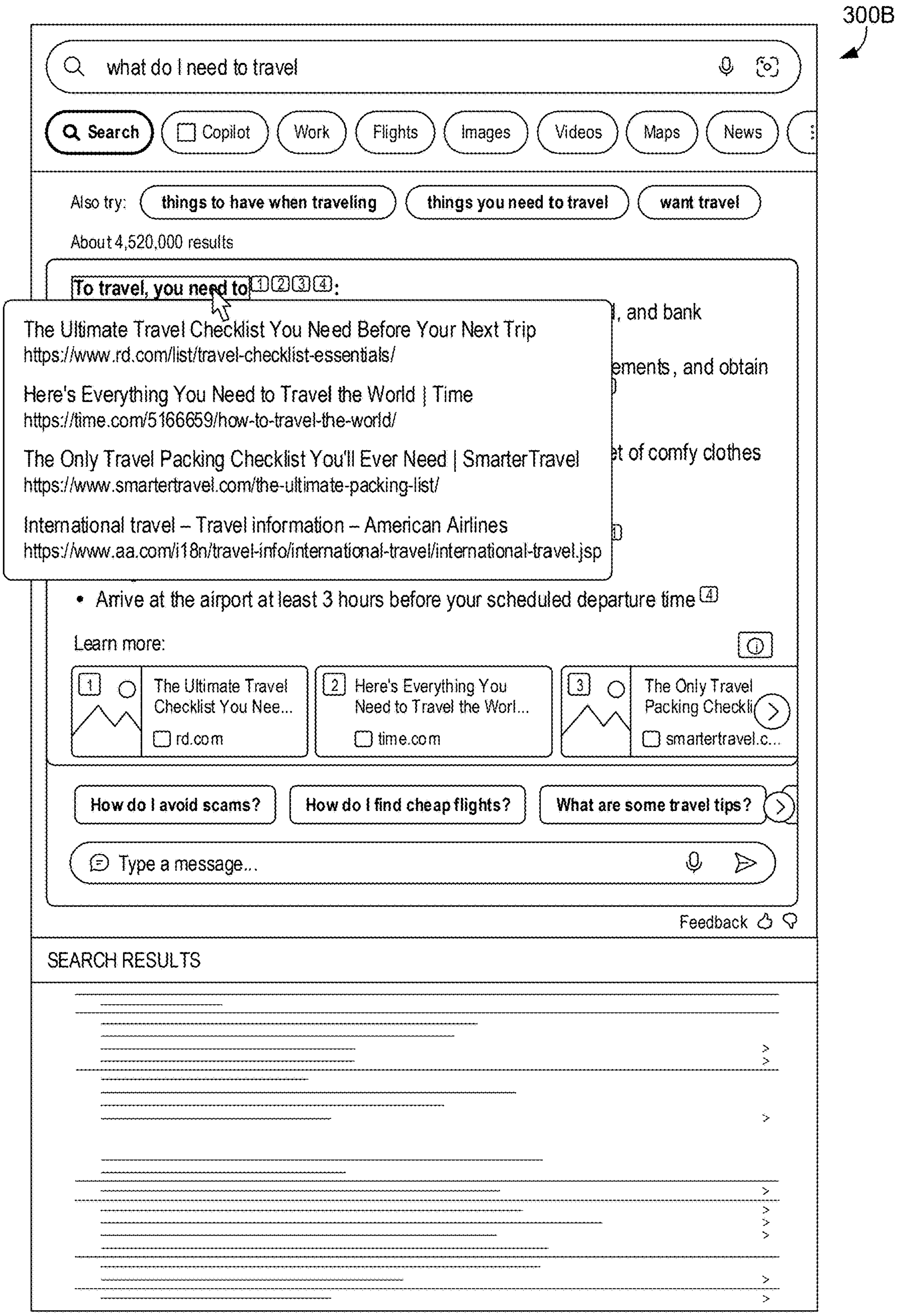

*FIG. 3B*

300C what do I need to travel

Q Search   ☐ Copilot   Work   Flights   Images   Videos   Maps   News

Also try:   things to have when traveling   things you need to travel   want travel About 4,520,000 results

To travel, you need to ①②③④:
- Have a printed itinerary and a copy of your passport, credit card, and bank contacts ①

The Ultimate Travel Checklist You Need Before Your Next Trip
  https://www.rd.com/list/travel-checklist-essentials/

The Only Travel Packing Checklist You'll Ever Need | SmarterTravel
  https://www.smartertravel.com/the-ultimate-packing-list/

- Check if yo
  the necess
- Book your
- Pack your
  ①
- Plan your ground transportation at your destination ①
- Take out cash and call your bank to inform them of your travel ①
- Bring a bottle of water and some snacks ①
- Arrive at the airport at least 3 hours before your scheduled departure time ④

Learn more:   ⓘ

| ① ○ The Ultimate Travel Checklist You Nee... ☐ rd.com | ② Here's Everything You Need to Travel the Worl... ☐ time.com | ③ ○ The Only Travel Packing Checkli... ☐ smartertravel.c... ❯ |

How do I avoid scams?   How do I find cheap flights?   What are some travel tips? ❯

Type a message...

Feedback 👍 👎

SEARCH RESULTS

❯
❯

❯

❯
❯
❯

❯
❯

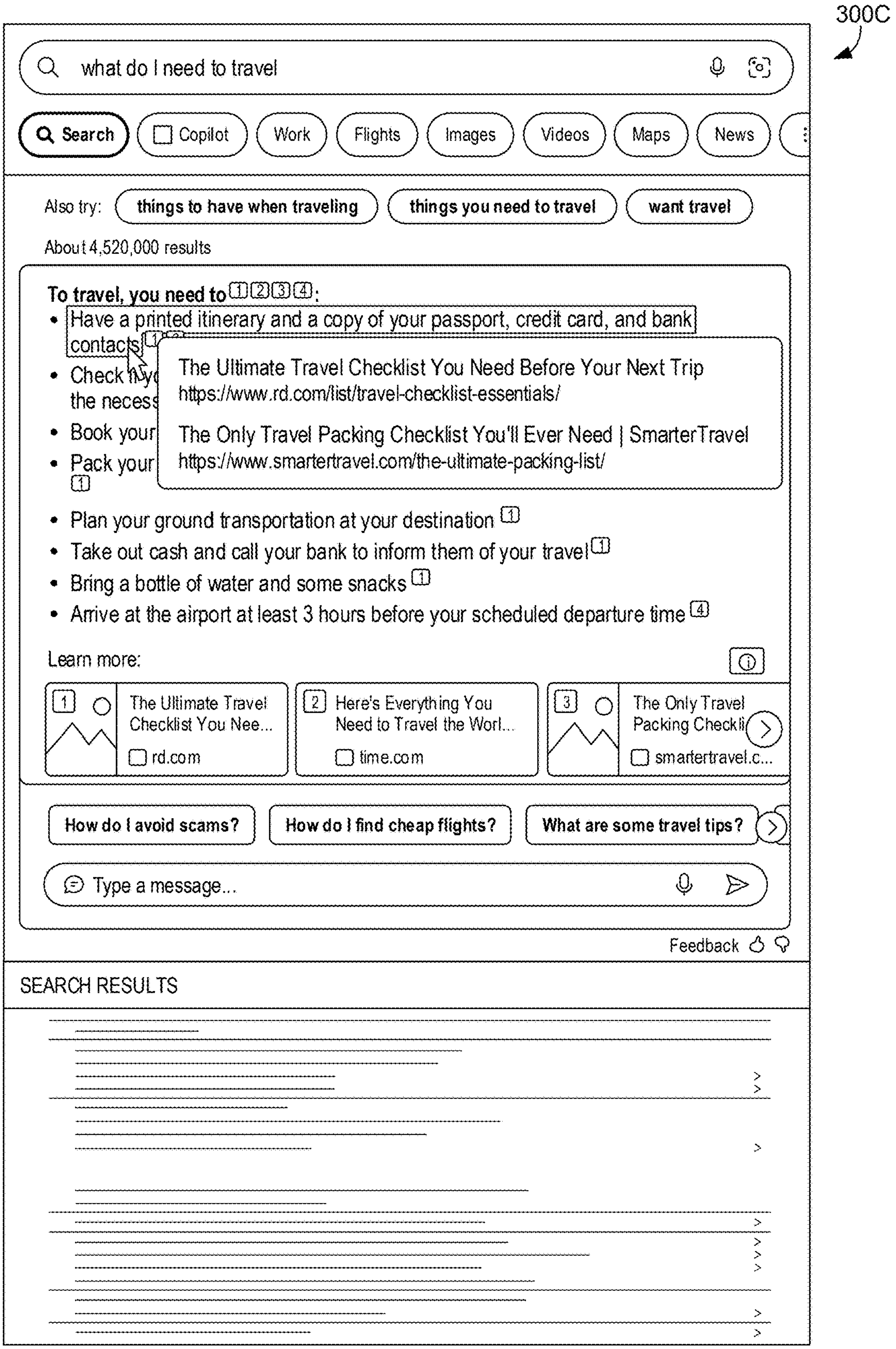

*FIG. 3C*

300F what do I need to travel abroad

Search    Copilot    Work    Videos    Images    Maps    News    Shopping

Also try:    traveling abroad programs    how to prepare for overseas travel

About 9,410,000 results

To travel abroad, you need to ①②③④:
- Get a passport and check the expiration date
- Get visas or permits for the countries you are visiting
- Check the entry requirements and additional fees for your destination
- Provide Advance Passenger Information (API) if required
- Get a child consent if you are traveling alone with minors
- Get an International Driving Permit if you plan to drive
- Make copies of your documents and screenshot your bookings
- Get overseas insurance coverage
- Sign up for the Smart Traveler Enrollment Program
- Bring medication prescriptions and a GP letter if needed Learn more:    ⓘ

| 1 30 Important Things to Prepare Before Travelin... | 2 What Documents Do You Need to Travel Abroad... | 3 Americans Traveling Abroad |
| --- | --- | --- |
| ▢ aswesawit.com | ▢ mscnotaries.com | ▢ travel.state.gov |

⟩

How do I get a passport?    What is an API?    How do I get a child consent?    Wl ⟩

☺ Type a message...    🎤    ▷

Feedback 👍 👎

SEARCH RESULTS

⟩
⟩

⟩

⟩
⟩
⟩

⟩
⟩

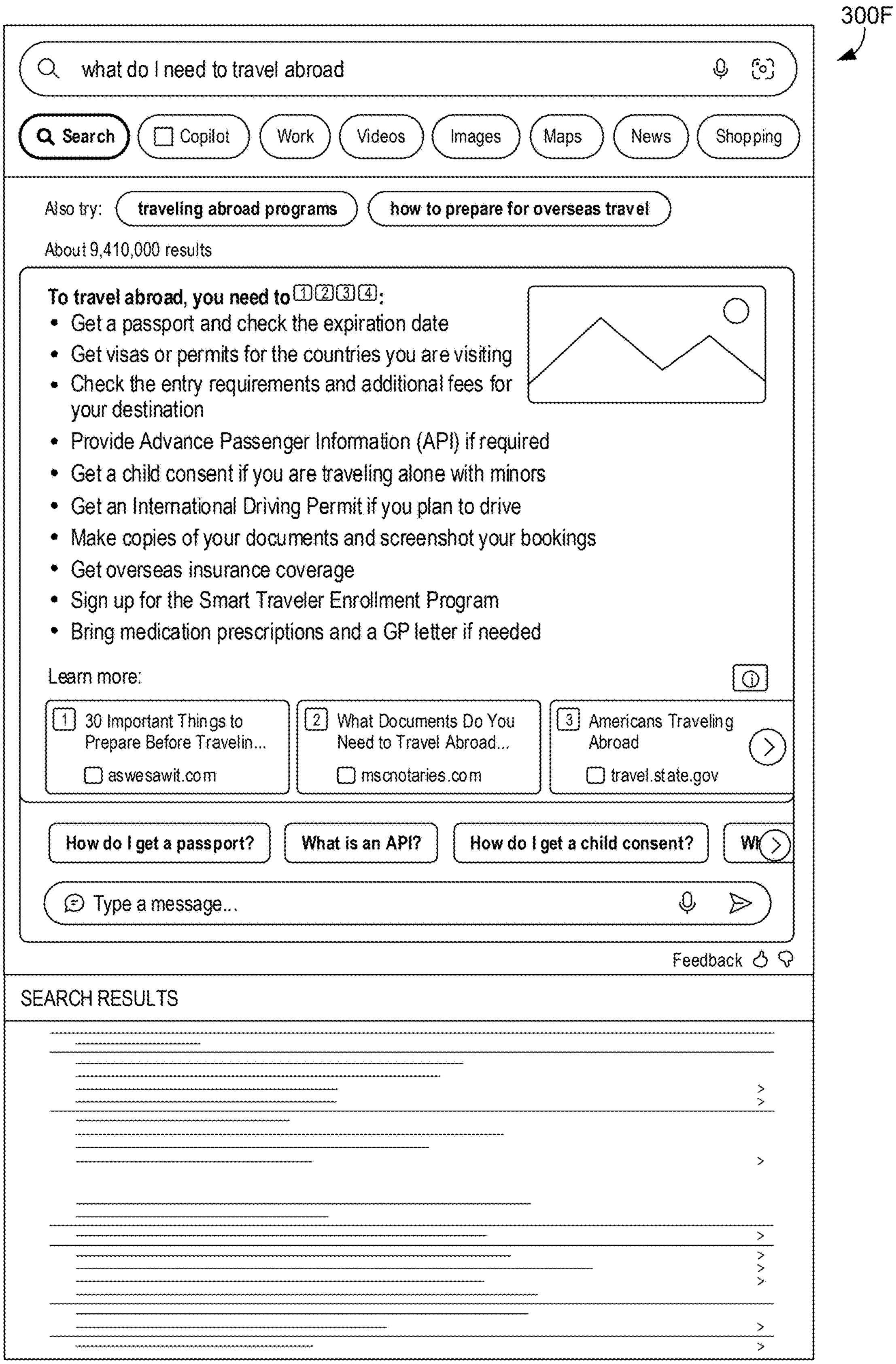

*FIG. 3F*

300G what do I need to travel abroad

Search | Copilot | Work | Videos | Images | Maps | News | Shopping

Also try: traveling abroad programs | how to prepare for overseas travel

About 9,410,000 results

To travel abroad, you need to [1][2][3][4]:
- Get a passport and check the expiration date
- Get visas or permits for the countries you are visiting
- Check the entry requirements and additio[...] your destination
- Provide Advance Passenger Information
- Get a child consent if you are traveling al[...]
- Get an International Driving Permit if you [...]
- Make copies of your documents and scre[...]
- Get overseas insurance coverage
- Sign up for the Smart Traveler Enrollment [...]
- Bring medication prescriptions and a GP letter if needed aswesawit.com Learn more:

| [1] 30 Important Things to Prepare Before Travelin... | [2] What Documents Do You Need to Travel Abroad... | [3] Americans Traveling Abroad |
|---|---|---|
| ☐ aswesawit.com | ☐ mscnotaries.com | ☐ travel.state.gov |

How do I get a passport? | What is an API? | How do I get a child consent? | Wr ⟩

Type a message...

Feedback 👍 👎

SEARCH RESULTS

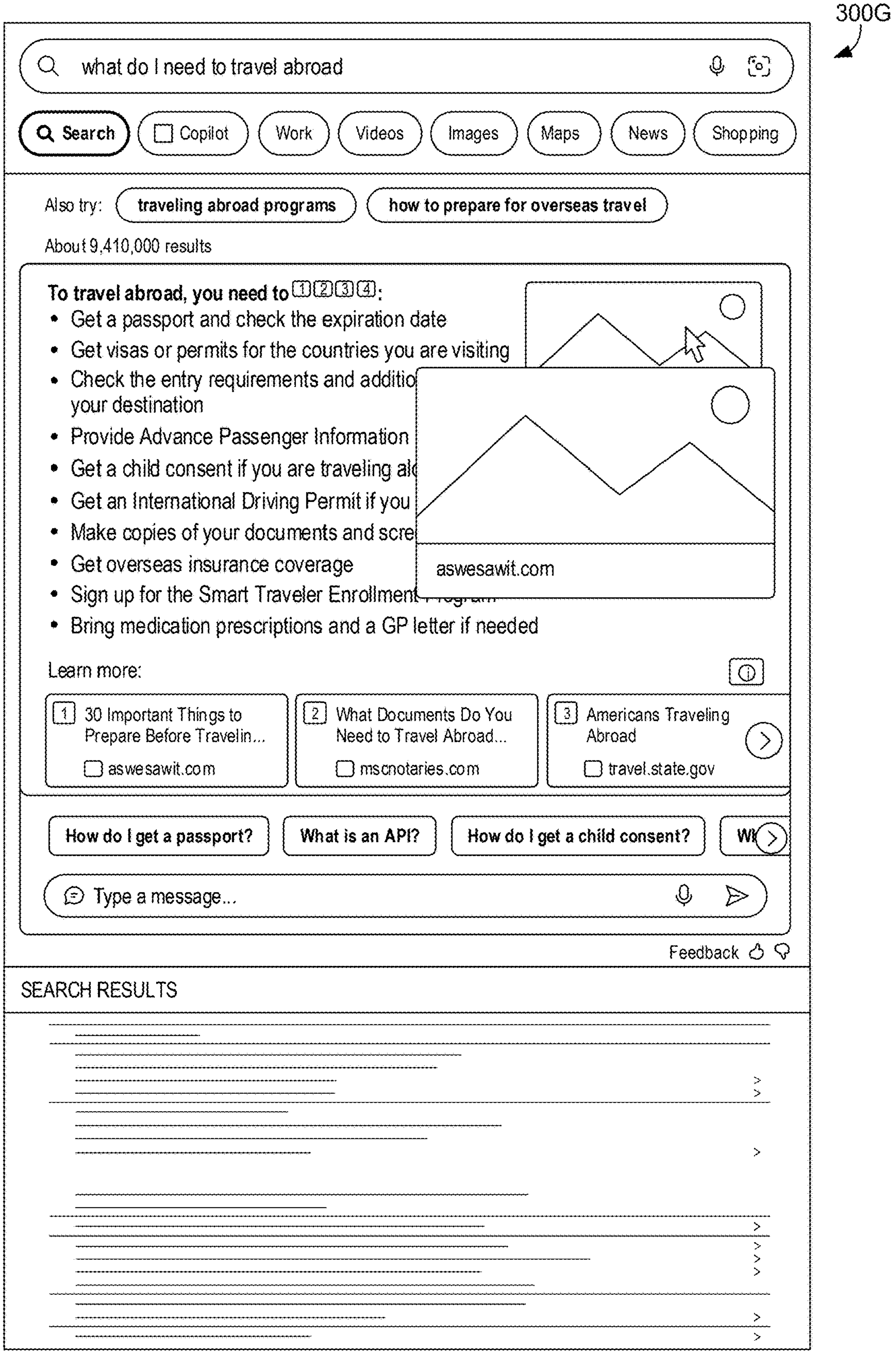

RECEIVE A SEARCH QUERY ~410

DETERMINE A SET OF SEARCH RESULTS ~420

DETERMINE A SET OF SNIPPETS, EACH SNIPPET CORRESPONDING TO EACH SEARCH RESULT ~430

GENERATE AN INPUT PROMPT BASED ON THE SET OF SNIPPETS AND INCLUDING AN INSTRUCTION TO GENERATE A SUMMARY BASED ON THE SNIPPETS ~440

PROVIDE THE INPUT PROMPT TO THE LANGUAGE MODEL, AND RECEIVE AN OUTPUT GENERATED BY THE LANGUAGE MODEL IN RESPONSE ~450

PROVIDE A REPRESENTATION OF THE SUMMARY IN RESPONSE TO THE QUERY ~460

STORE THE REPRESENTATION OF THE SUMMARY IN CACHE ASSOCIATED WITH THE QUERY ~470

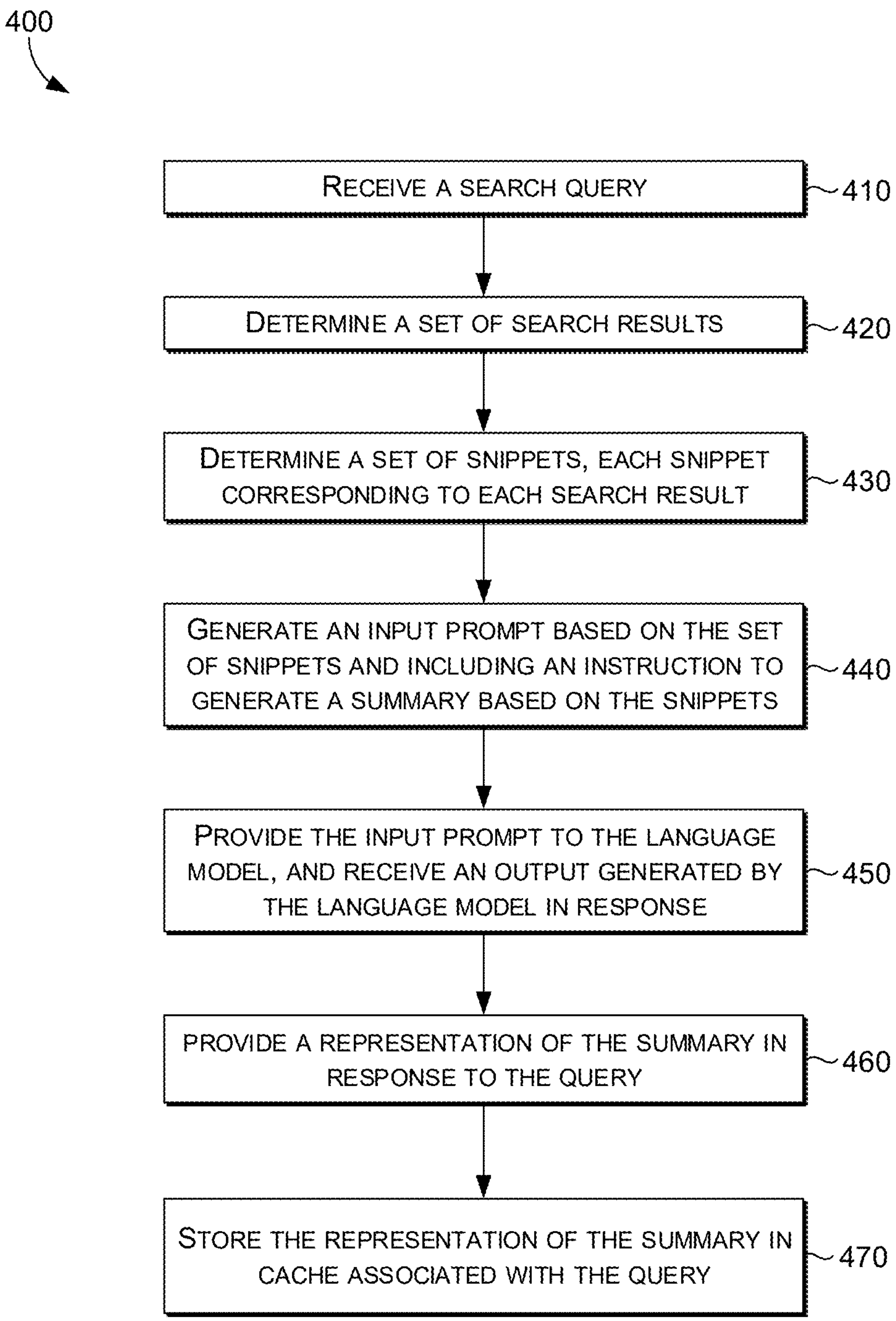

RECEIVE A SEARCH
QUERY

520

SEARCH QUERY
SIMILAR TO PRIOR CACHED
SEARCH QUERY?

NO

YES

530

GENERATE A
SUMMARY USING A
LANGUAGE MODEL

550

ACCESS REPRESENTATION
OF A SUMMARY FROM
CACHE

540

PROVIDE A
REPRESENTATION OF THE
SUMMARY IN RESPONSE TO
THE QUERY

560

PROVIDE THE
REPRESENTATION OF THE
SUMMARY FROM CACHE IN
RESPONSE TO THE QUERY

GENERATING AND PROCESSING SUMMARIES OF SEARCH RESULTS USING A LANGUAGE MODEL

BACKGROUND

Search engines play a crucial role in helping users find relevant information on the internet by filtering through vast amounts of content to make it easier for users to locate relevant resources without sifting through irrelevant web pages. In addition to the uniform resource locator (URL) of the website of the search result, existing search engines provide the title of the website and a portion of the website that is relevant to the query in order to make it easier for users to locate relevant resources, but often there is information relevant to the query that is shared across multiple relevant search results. In these instances, the user is required to access each of the multiple relevant search results and read through each search result to determine whether the information is indeed relevant to the query.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed towards technologies for improving electronic search engine technology and enhanced computing services for a user, based on determining generative summaries for search results in response to a search query. In particular, this disclosure provides technologies to programmatically generate a summary of search results by a language model, such as a large language model (LLM), a language model that is fine-tuned to generate a summary of search results, and/or the like, based on the corresponding relevance of the search results to a live search query. In some implementations, the summary is generated by the language model in real-time and provided as a live response to a live search query. For example and according to an embodiment, a user inputs a search query into a search engine and the search engine determines and ranks a set of search results (for example, websites, images, videos, documents, such as news articles, and/or any search results provided by a search engine) based on the relevance of each of the search results. From a subset of the most relevant search results, a snippet of information is determined and extracted, based on the relevance of the extracted information of the snippet to the input search query. The snippets of information for the subset of the most relevant search results are used to generate an input prompt to a language model with an instruction to generate a summary of the snippets of information based on the input search query. The language model outputs a generated summary based on the input prompt that includes the snippets of information of the search results and the input search query. The generated summary is provided to the user in response to the input search query. In some implementations, the generated summary is included in a webpage of search results that is provided in response to the input search query. Further, when the latency in providing the generated summary is above a threshold amount of time, some embodiments render the portion of the web page providing the generated summary subsequent to rendering the portion of the web page providing the search results so that the user is more quickly provided at least a partial response to the query. After a generated summary is provided in response to an input search query, the generated summary can be cached in order to provide the generated summary in response to similar search queries in the future.

BRIEF DESCRIPTION OF THE DRAWINGS

Aspects of the disclosure are described in detail below with reference to the attached drawing figures, wherein:

FIGS. 3A-3G illustratively depict example schematic screenshots from a personal computing device showing aspects of an example user interface, in accordance with an embodiment of the present disclosure;

FIGS. 4-5 depict flow diagrams of methods for programmatically generating a summary by a language model of search results based on the corresponding relevance of the search results to an input search query, in accordance with an embodiment of the present disclosure;

DETAILED DESCRIPTION

Figure 1:
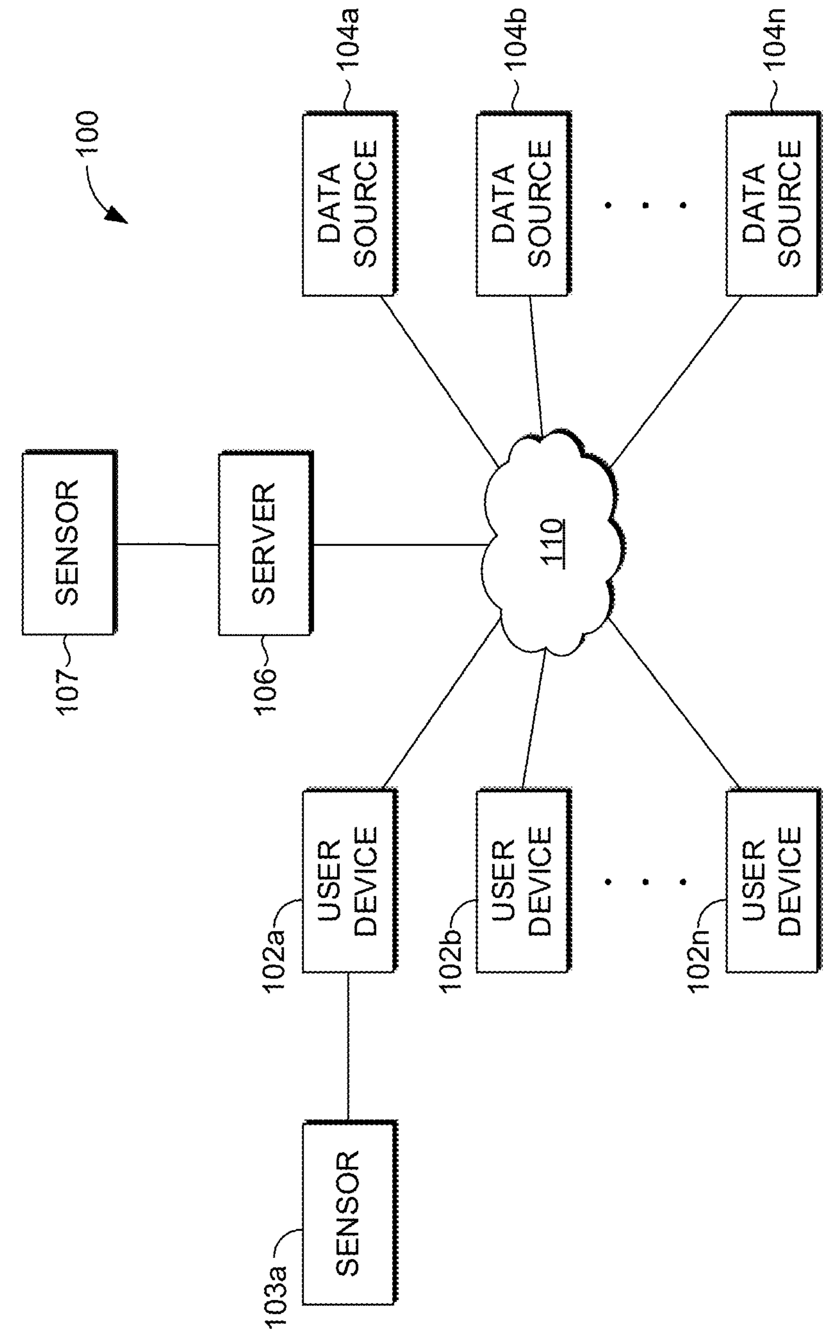
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, such as to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Aspects of the present disclosure relate to technology for improving electronic search engine technology and enhanced computing services for a user, based on determining generative summaries for search results for a given search query. In particular, the solutions provided herein include technologies to programmatically generate a summary of search results by a language model in real-time based on the corresponding relevance of the search results to a live search query. For example, a user inputs a search query (for example, a user inputs a natural language question as the search query) into a search engine user interface and the search engine searches a database based on the input search query using any technique (for example, a search engine indexes search results by crawling web pages, parsing the web pages to extract content and metadata, and organizing the information as data structures, such as inverted indexes, in a database, such as an index using any known technique to process and understand context, such as natural language processing (NLP) to make relevant search results quickly accessible). The search engine determines and ranks a set of search results (for example, websites, images, videos, documents, such as news articles, and/or any search results provided by a search engine) based on the relevance of each of the search results to the input search query using any technique (for example, PageRank, bidirectional encoder representations from transformers (BERT), and/or any other search algorithm).

A snippet of information, such as a portion of information from a website, is determined and extracted from each of the search results, or a subset of the most relevant search results. For example, from each of the most relevant search result or from a threshold number of the most relevant search results, such as the top 20 search results, a snippet of information is determined and extracted, based on the relevance of the extracted information of the snippet to the input search query. In some implementations, the snippet of information can be based on any information stored in the search engine database regarding the search result. For example, the snippet of information can include extracted data from the search result, such as text data of the search result, image data of the search result (for example, image data extracted using image recognition and analysis techniques, such as through convolutional neural networks (CNNs)), metadata associated with the search result, a generative summary of the search result or portion of the search result, such as the output of a different language model summarizing the search result, and/or any data regarding the search result that is stored in the search engine database and/or associated with the search result. In some implementations, the snippet of information can correspond to a list of items, such as a list of items provided on a website.

In some implementations, the size(s) of each snippet and/or the number of snippets generated is determined based on the language model that is used to generate the summary of one or more search results. For example, the size(s) of each snippet and/or the number of snippets generated can be determined based on aspects of the language model, including cost per use or token size, token constraints, processing speed, and/or any other aspects of the language model. In this regard, if the amount of relevant search results provided to the language model to generate a summary of the relevant search results based on the search query is increased, the size of the snippets used by the language model to generate the summary can be decreased to meet token constraints or processing speed requirements. For example, snippet-generation logic (for example, a model that optimizes any combination of factors, such as the size of each snippet based on the number of snippets, processing speed, and token constraints) is used to determine the size of the snippet of information for each relevant search result and/or the number of snippets to be used to generate a summary in response to a particular input search query.

The snippets of information for each of the search results, or a subset of the most relevant search results (for example, the most relevant search result or a threshold number of the most relevant search results, such as the top 20 search results), are used to generate an input prompt to a language model with an instruction to the language model to generate a summary of the snippets of information based on the input search query. In some implementations, the snippets of information for each of the search results, or a subset of the most relevant search results (for example, the most relevant search result or a threshold number of the most relevant search results, such as the top 20 search results), are provided to a snippet qualifying model (for example, a transformer encoder model, or other machine learning model, such as a deep learning model, a generative language model, and/or any other models) to qualify the snippets of information of the search results by determining whether the likelihood that the snippets of information provide an answer to the search query is above a threshold likelihood. As a specific example, the snippets of information from the top twenty (20) search results can be provided to the snippet qualifying model with the input search query. The snippet qualifying model may determine that the snippets of information from five (5) out of the top twenty (20) search results are qualified to provide an answer to the search query. In this regard, the snippets of information from the five (5) qualified search results are used to generate an input prompt to a language model with an instruction to the language model to generate a summary of the snippets of information based on the input search query.

A specific example of an input prompt to a language model with an instruction to the language model to generate a summary of the snippets of information based on the input search query can include as follows:

```
# Instructions
## Summarize search results and give citations
A user is searching for information online. You are given a user
query and a list of text snippets from web search. Briefly
summarize the search results to answer the user query, in the
same language as the query and text snippets. The summary
should be concise and no more than [[X]] words.
## Formatting
- When appropriate, use markdown format and "**" to highlight
continuous spans of text that directly addresses the query or
contains the main ideas of the summary.
- Always cite the source that supports each statement made in the
summary.
- Only use sources that are useful and ignore the unrelated ones.
- Use "\n\n" at the beginning of a new paragraph.
- [Other minor formatting instructions]
## Examples
Example 1
Query:
[[query 1]]
Snippets from web search:
[1] [[Text snippet 1]]
[2] [[Text snippet 2]]
[3] [[Text snippet 3]]
[4] [[Text snippet 4]]
...
Summary:
[[Statement 1[1][2]. Statement 2[1][3]. Statement 3[2][4]. ...]]
Example 2
...
...
[assistant](#language)
Example X
Query:
[[Placeholder for current query]]
Snippets from web search
[[Placeholder for search snippets]]
Summary:
```

In some embodiments, the language model that is utilized to generate a summary of the snippets of information of search results based on the input search query is an LLM (for example, Generative Pre-trained Transformers (GPT) and/or the like). In some embodiments, the language model that is utilized to generate a summary of the snippets of information based on the input search query is a language model that is fine-tuned for generating summaries of the snippets of information of search results based on input search queries. For instance, a fine-tuned language model that is smaller than a corresponding LLM may be used. In some implementations a smaller, fine-tuned language model is trained using a more robust LLM. In some embodiments, an LLM can be utilized to generate summaries of the snippets of information of search results based on input search queries as training data. The training data (for example, the summaries generated by the LLM, the snippets of information of search results, and the input search queries) can be used to fine-tune a language model to generate summaries of the snippets of information of search results based on input search queries.

The language model outputs a generated summary (for example, a natural language summary) based on the input prompt that includes the snippets of information of the search results and the input search query. In this regard, the generated summary is provided in response to the input search query in real-time for presentation to the user. Portions of the generated summary are annotated with citations to the particular search result item that supports the particular portion of the generated summary. For example, each item of a list, groups of items in a list, or an entire list of a generated summary may include a citation with a corresponding link (for example, the URL) of the particular search result item. As another example, each phrase, sentence, and/or group of sentences may include a citation with a corresponding link (for example, the URL) of the particular search result item. In order to generate the citations, an instruction is provided to the language model to include the citations when generating the summary of the snippets of information based on the input search query.

In some implementations, a generated summary annotated with citations to each search result may be assembled and formatted or prepared for presentation to the user via a user interface (UI) element. Examples of such a UI element are further described in connection with FIGS. 3A, 3B, 3C, 3D, 3E, 3F, and 3G. In some implementations, the generated summary annotated with each search result may be assembled and formatted or prepared for presentation to the user via a UI element including a list of items. Examples of such a UI element are further described in connection with FIGS. 3A-3C and 3F-3G. In some implementations, the generated summary annotated with each search result may be assembled and formatted or prepared for presentation to the user via a UI element that responds to a user hovering over a portion of the generated summary by providing a corresponding source (e.g., a URL of the website from which the portion of the generated summary was determined by the language model) for the portion of the generated summary. Examples of such a UI element are further described in connection with FIGS. 3A-3G.

In some implementations, the generated summary annotated with each search result may be assembled and formatted or prepared for presentation to the user via a UI element including an image(s). One example of such a UI element is further described in connection with FIGS. 3F and 3G. In some implementations, the generated summary annotated with each search result may be assembled and formatted or prepared for presentation to the user via a UI element including the cited search results below the summary (for example, including links to each of the search results, titles, snippets of information, extracted images, and/or the like) in order to enable the user to easily view the sources of the generated summary. Examples of such a UI element are further described in connection with FIGS. 3A-3G. In some implementations, the generated summary annotated with each search result may be assembled and formatted or prepared for presentation to the user via a UI element including the cited search results in the summary (for example, including links to each of the search results, titles, snippets of information, extracted images, and/or the like). Examples of such a UI element are further described in connection with FIGS. 3A and 3B.

In some embodiments, the generated summary is located in a delineated space of the UI element. For example, the generated summary annotated with each search result may be assembled and formatted or prepared for presentation to the user via a UI element in a delineated space on the web page including the cited search results below the summary. Examples of such a UI element are further described in connection with FIGS. 3A-3G. In some embodiments, an instruction is provided to the language model to generate a short answer, in addition to generating the summary of the snippets of information, based on the input search query. In some implementations, the short answer generated by the language model in response to the input search query is located in a delineated space of the UI element. For example, the generated summary annotated with each search result may be assembled and formatted or prepared for presentation to the user via a UI element in a delineated space on the web page including the cited search results below the summary and a short answer generated by the language model may be in a corresponding delineated space within the delineated space of the generated summary. Examples of such a UI element are further described in connection with FIGS. 3D-3E.

In some embodiments (for example, when the latency in providing the generated summary is above a threshold amount of time), the portion of the web page providing the generated summary is rendered after the portion of the web page providing the search results is rendered. For example, in some implementations, the UI of the search engine provides a delineated space for the generated summary (and/or other corresponding data of the generated summary, such as a citation(s), an image(s), a short answer, and/or the like) and the UI provides search results below the delineated space. In this regard, the portion of the UI providing the search results can be rendered while the language model is still generating the summary in order to optimize presentation of a response to the search query and improve the user experience. Subsequently, the generated summary can be rendered in the delineated space to provide the generated summary to the user. In some embodiments, an indication can be provided in the delineated space indicating that the generated summary is still loading before the generated summary is rendered in the delineated space. For example, in some implementations, the search engine provides a loading bar via a UI element while the generated summary is generated before the generated summary is rendered on the UI of the search engine. As another example, in some implementations, the search engine provides an extracted key phrase (e.g., via a deep learning model or other machine learning model with lower latency than the language model used to generate the generated summary) while the generated summary is generated before the generated summary is rendered on the UI of the search engine.

In some embodiments, the language model utilizes contextual information to generate a summary of the snippets of information of search results based on the input search query. For example, data regarding the search session, such as previous search queries, search results, and/or generated summaries, may be provided to the language model to provide additional context when generating the summary. In some embodiments, the contextual information can include information about the user, such as location data, to provide additional context when generating the summary. As a specific example, within a search session (or a time frame), a user first searches on flights to Paris in summer 2024. Subsequently and in the same search session, the user asks "what are some sight-seeing tips for visiting Paris." In this specific example, the generated summary that relies on search-session context of the user may include information about large crowds expected to be in Paris in summer 2024 due to the Olympics based on the prior search.

In some implementations, the language model generates a summary of the snippets of information of search results and the language model generates additional summaries of related snippets of information of search results (for example, based on contextual information, such as previous search history of other users). For example, the language model generates an initial summary of search results in response to the search query. The language model also generates additional related summaries of related search results and corresponding topics of the related summaries. The UI presents the initial summary in response to the search query and the corresponding topics of the related summaries. The user can then select the related topic to view the related summary.

In some implementations, the generated summary provided in response to the user's input search query is cached in order to provide the generated summary in response to similar search queries in the future and/or for use in other application contexts (for example, various applications by Microsoft® may access generated summaries from input search queries into BING® by Microsoft®). For example, the generated summary is cached, along with the input search query, and provided in response to future input search queries that are semantically similar to the input search query that was used to generate the summary. Similarity between subsequent input search queries to previous input search queries that include a corresponding cached generated summary can be determined using semantic similarity or any other similarity technique. For example, Nearest Neighbor Index can be used to determine whether an input search query is above a threshold similarity to a previous input search query with a corresponding cached generated summary. In this regard, in some implementations, the cached generated summary can be rendered with the search results in the search engine UI as the cached generated summary can be provided in near real-time to a subsequent similar input search query. In some embodiments, summaries are generated by a language for historical search queries and cached (for example, immediately after receiving a search query and/or a threshold number of similar search queries, offline, and/or when the LLM cost is lower, such as non-peak times) using the snippets of information for each of the search results, or a subset of the most relevant search results. In this regard, the generated summary that uses the snippets of information for each of the search results, or a subset of the most relevant search results, is cached so that the generated summary can be provided in near real-time in response to a future input search query that is similar to the historical search query that was used to generate the generated summary. In some embodiments, the cached generated summary based on the input search queries may be updated periodically (for example, weekly) by generating a new generated summary.

In this regard, the generated summary can be presented to the user to facilitate improved search results from a search engine in response to an input search query. For example, in one embodiment, when a user inputs a search query into a search engine, the search engine presents a generated summary based on the input search query from the top ranked search results to the user via a UI. In one embodiment, the UI is presented in a search engine application such as Bing® by Microsoft®. When the user reviews the generated summary, the user can review the results of the generated summary without having to manually perform multiple search queries and access and review multiple search results for each of the search queries in order to find the relevant answer to the user's input search query. For example, the user can easily read the generated summary, such as a list of items, and hover over the portions of the generated summary to determine the sources for the information. In this way, and as further described herein, computer resources including computer processing, memory, and network communication bandwidth are conserved because a user is not required to perform multiple search queries and access and review multiple search results for each search query.

Further, the caching of the generated summaries in response to input search queries facilitates improved search engine processing and response times with respect to generated summaries in response to input search queries. For example, in one embodiment, when a user inputs a search query into a search engine, the search engine accesses cached generated summaries based on similar, previously input search query to present a previously-generated summary from the top ranked search results to the user via a UI. The accessing of cached generated summaries reduces computational expense and increases processing speed to present the generated summary. In this way, and as further described herein, computer resources including computer processing, memory, and network communication bandwidth are conserved because the cached generated summaries are accessed and presented instead of calling a language model to generate a new generated summary.

Even further, the solutions provided herein may be used for, among other beneficial computing applications, providing enhanced functionality and improved efficiency for search engine and other computing applications, as well as improved computing experiences for users, such as personalized computing experiences, among other improvements described herein.

Overview of Technical Problems, Technical Solutions, and Technological Improvements Conventional technology lacks computing functionality to programmatically generate a summary of search results by a language model in real-time based on an input search query because there is often information relevant to the query that is shared across multiple relevant search results. As the amount of relevant search results from a typical search engine query exceeds the practical input limitations (e.g., token limit) for the language model, the language model is unable to receive as input each of the relevant search results for the given input search query. Further, due to the increased latency for an language model to generate a response to a given query, an language model can cause a poor user experience as users expect nearly instantaneous search results in response to search queries through a search engine.

Consequently, because conventional technology lacks this functionality, a user must manually access each of the multiple relevant search results and read through each search result to determine whether the information is indeed relevant to the query. In many instances, the user must perform multiple search queries and access multiple relevant search results for each of the multiple search queries. For example, the user must manually identify and then access websites, documents, images, videos, and others from the search results. This data then must be manually reviewed to determine whether a search result matches their input search query. Accordingly, existing approaches for determining a corresponding answer to an input search query requires significant manual processes. Unfortunately, because the answer to an input search query must be manually determined by a human, the process is time-consuming, labor intensive, and computationally expensive in order to access data from storage, process the data for presentation, manually review the data, and manually sift through the data. In this regard, additional computing and network resources must be utilized, such as increased processing requirements due to increased input/output operations and increased network bandwidth utilization when the data is transmitted over a network and accessed by the user.

Accordingly, automated computing technology for programmatically generating summaries of search results by a language model based on the corresponding relevance of the search results to a live search query, as provided herein, can be beneficial for enabling improved computing applications and an improved user computing experience. For example, automated computing technology for programmatically generating summaries by a language model of search results based on the corresponding relevance of the search results to a live search query reduces the computing and networking resources utilized while conducting search queries through a search engine by facilitating a generated summary of the relevant search results so that the user is not required to manually identify, access, process, and review data for each of the search results of each of the search queries. In this regard, the computing and network resources are conserved. Further, embodiments of this disclosure address a need that arises from a very large scale of operations created by software-based services that cannot be managed by humans. The actions/operations described herein are not a mere use of a computer, but address results of a system that is a direct consequence of software used as a service offered in conjunction with search engines through services hosted across a variety of platforms and devices. Further still, embodiments of this disclosure enable an improved user experience across a number of computer devices, applications, and platforms. Further still, embodiments described herein enable certain data in response to search queries to be programmatically determined and presented without requiring computer tools and resources for a user to manually perform operations to produce this outcome. In this way, some embodiments, as described herein, reduce or eliminate a need for certain databases, data storage, and computer controls for enabling manually performed steps by an administrator, or the user themselves, to search, identify, assess, and configure (e.g., by hard-coding) specific, static data, thereby reducing the consumption of computing resources.

Additional Description of the Embodiments

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as: user devices 102*a* and 102*b* through 102*n*; a number of data sources, such as data sources 104*a* and 104*b* through 104*n*; server 106; sensors 103*a* and 107; and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102*a* and 102*b* through 102*n* can be client user devices on the client-side of operating environment 100, while server 106 can be on the server-side of operating environment 100. Server 106 can comprise server-side software designed to work in conjunction with client-side software on user devices 102*a* and 102*b* through 102*n* so as to implement any combination of the features and functionalities discussed in the present disclosure. This division of operating environment 100 is provided to illustrate one example of a suitable environment, and there is no requirement for each implementation that any combination of server 106 and user devices 102*a* and 102*b* through 102*n* remain as separate entities.

User devices 102*a* and 102*b* through 102*n* may comprise any type of computing device capable of use by a user. For example, in one embodiment, user devices 102*a* through 102*n* may be the type of computing device described in relation to FIG. 6 herein. By way of example and not limitation, a user device may be embodied as a personal computer (PC), a laptop computer, a mobile or mobile device, a smartphone, a smart speaker, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, an appliance, a consumer electronic device, a workstation, any other suitable computer device, or any combination of these delineated devices.

Data sources 104*a* and 104*b* through 104*n* may comprise data sources and/or data systems, which are configured to make data available to any of the various constituents of operating environment 100 or system 200 described in connection to FIG. 2. For instance, in one embodiment, one or more data sources 104*a* through 104*n* provide (or make available for accessing), to search query input component 230 of FIG. 2, search results component 240 of FIG. 2, snippet component 250 of FIG. 2, prompt generation component 260, presentation component 270, summary caching component 280, and find-tuning component 290 in order to access data corresponding to search queries, results, user data, generated summaries and/or the like. In one embodiment, one or more data sources 104*a* through 104*n* provide (or make available for accessing), user data through contextual data accessing component 262. Data sources 104*a* and 104*b* through 104*n* may be discrete from user devices 102*a* and 102*b* through 102*n* and server 106 or may be incorporated and/or integrated into at least one of those components. In one embodiment, one or more of data sources 104*a* through 104*n* comprise one or more sensors, which may be integrated into or associated with one or more of the user device(s) 102*a*, 102*b*, or 102*n* or server 106.

Figure 2:
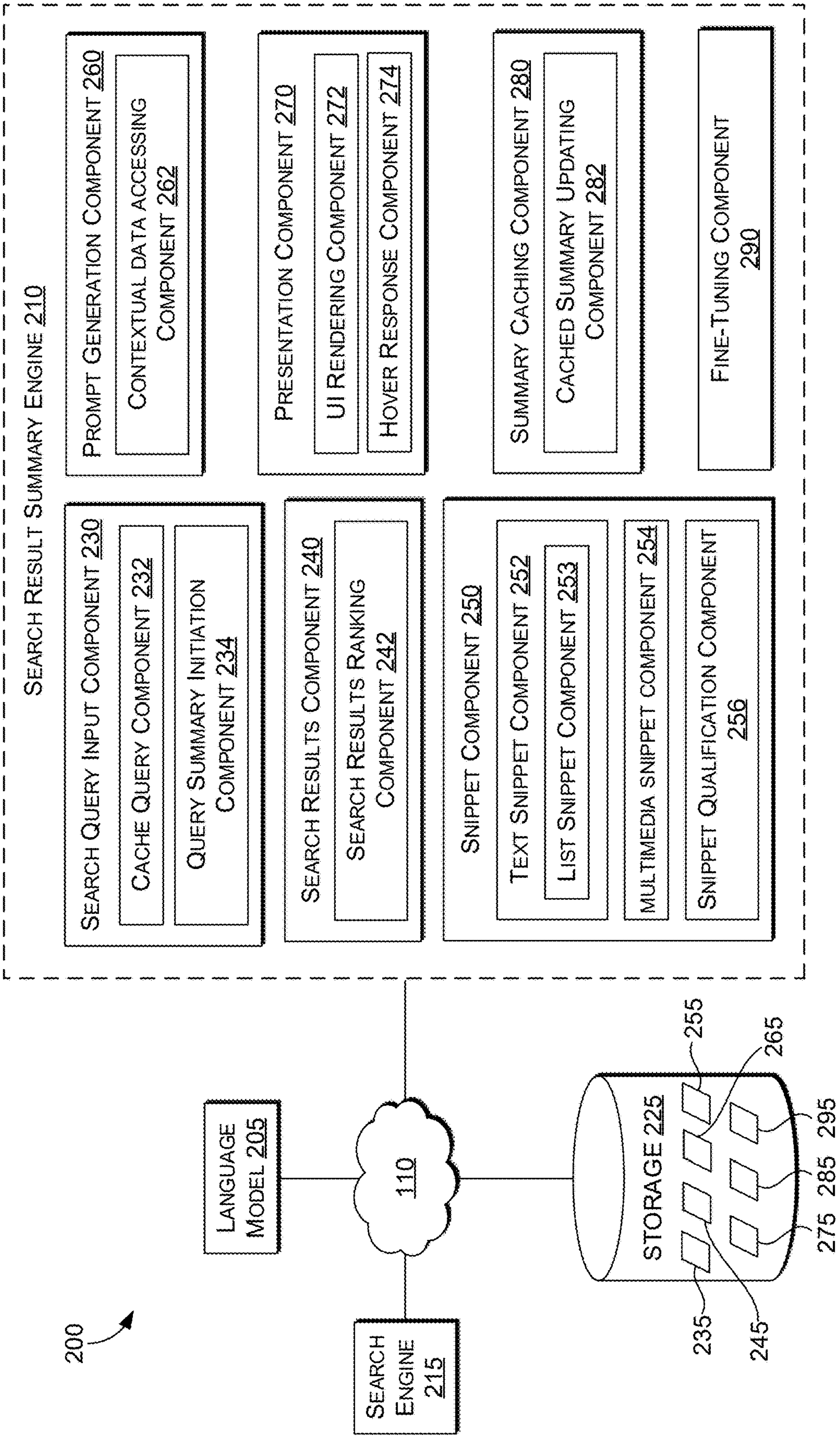
FIG. 2 is a diagram depicting an example computing architecture suitable for implementing aspects of the present disclosure.

Operating environment 100 can be utilized to implement one or more of the components of system 200, described in FIG. 2. Operating environment 100 can also be utilized for implementing aspects of methods 400 and 500 in FIGS. 4-5, respectively.

Referring now to FIG. 2, with continuing reference to FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200, including language model 205, search engine 215, storage 225 (including its subcomponents search query input component logic 235, search results component logic 245, snippet component logic 255, prompt generation component logic 265, presentation component logic 275, summary caching component logic 285, and fine-tuning component logic 295), search results summary engine 210, including its subcomponents, search query input component 230 (including its subcomponents cache query component 232 and query summary initiation component 234), search results component 240 (including its subcomponents search results ranking component 242), snippet component 250 (including its subcomponents text snippet component 252, list snippet component 253, multimedia snippet component 254, and snippet qualification component 256), prompt generation component 260 (including its subcomponents contextual data accessing component 262), presentation component 270 (including its subcomponents UI rendering component 272 and hover response component 274), summary caching component 280 (including its subcomponents cached summary updating component 282), and fine-tuning component 290, may be embodied as a set of compiled computer instructions or functions, program modules, computer software services, or an arrangement of processes carried out on one or more computer systems, such as computing device 600, described in connection to FIG. 6, for example.

In one embodiment, the functions performed by components of system 200 are associated with one or more computer applications, services, or routines, such as search engine, etc. The functions may operate to determine and/or generate a summary of search results in response to a search query, or otherwise to provide an enhanced computing experience for the user. In particular, such applications, services, or routines may operate on one or more user devices (such as user device 102*a*) or servers (such as server 106). Moreover, in some embodiments, these components of system 200 may be distributed across a network, including one or more servers (such as server 106) and/or client devices (such as user device 102*a*) in the cloud, such as described in connection with FIG. 7, or may reside on a user device, such as user device 102*a*. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. Additionally, although functionality is described herein with regard to specific components shown in example system 200, it is contemplated that in some embodiments, functionality of these components can be shared or distributed across other components.

Search results summary engine 210, including its subcomponents, is generally responsible for programmatically generating a summary of search results by language model 205 (for example, a large language model (LLM), a language model that is fine-tuned via fine-tuning component 290 to generate a summary of search results, and/or the like) based on the corresponding relevance of the search results to a live search query received via search engine 215. For example, a user inputs a search query into search engine 215 and the search result summary engine 210 determines and ranks a set of search results (for example, websites, images, video, documents, such as news articles, and/or any search results provided by a search engine) via search results ranking component 240 based on the relevance of each of the search results. A snippet of information, such as an extracted list of items from a website, is determined via snippet component 250 for subset of the most relevant search results based on the relevance of the snippet of information of the search result to the input search query. The snippets of information for the subset of the most relevant search results are used to generate an input prompt via prompt generation component 260 to language model 205 with an instruction to generate a summary of the snippets of information based on the input search query. The language model 205 outputs a generated summary based on the input prompt including the snippets of information of the search results and the input search query. The generated summary is provided in response to the input search query in real-time via presentation component 270. In some embodiments (for example, when the latency in providing the generated summary is above a threshold amount of time), the portion of the web page providing the generated summary is rendered via presentation component 270 after the portion of the web page providing the search results is rendered. After the generated summary is provided in response to the input search query, the generated summary can be cached via summary caching component 280 in order to provide the generated summary in response to similar search queries in the future.

Embodiments of language model 205 can include any known technique to understand, interpret, and/or generate natural language. In some embodiments, language model 205 is an LLM that is utilized to generate a summary of the snippets of information of search results based on the input search query. In some embodiments, language model 205 is a language model (for example, a language model that is smaller than a corresponding LLM) that is fine-tuned (for example, by fine-tuning component 290) for generating summaries of the snippets of information of search results based on input search queries.

Embodiments of search engine 215 can include any software system designed to carry out web searches (or other searches), allowing users to find information, such as information on the internet, by typing keywords, phrases, questions, images, and/or the like. For example, search engine 215 can index and rank webpages using any known technique in order to provide the most relevant search results to the user's query.

Continuing with FIG. 2, search query input component 230, including its subcomponents cache query component 232 and query summary initiation component 234, is generally responsible for accessing an input search query from search engine 215 and determining whether to provide a generated summary from cache via cache query component 232 or initiate the generation of a summary via query summary initiation component 234. Embodiments of search query input component 230 may determine whether to provide a generated summary from cache via cache query component 232 based on a generated summaries cached by summary caching component 280. Thus, information regarding generated summaries cached by summary caching component 280 may be accessed by search query input component 230 (including its subcomponents) in storage 225. The data generated by search query input component 230 (including its subcomponents) may be stored in storage 225, where it may be used by other components or subcomponents of system 200.

Embodiments of search query input component 230 may access an input search query from search engine 215. Embodiments of search query input component 230, through cache query component 232, may determine whether the input search query accessed by search query input component 230 is semantically similar to previous search query that were used to generate summaries and cached by summary caching component 280. For example, similarity between the input search query to previous input search queries that include a corresponding cached generated summary can be determined via cache query component 232 using semantic similarity or any other similarity technique. For example, Nearest Neighbor Index can be used via cache query component 232 to determine whether an input search query is above a threshold similarity to a previous input search query with a corresponding cached generated summary. If the cached generated summary is above a threshold similarity, cache query can communicate the cached generated summary to presentation component 270 for presentation of the cached generated summary via search engine 215 in response to the input search query. Embodiments of search query input component 230, through query summary initiation component 234, may initiate generation of a summary via search result summary engine 210 when there are no semantically similar previous search query that were used to generate summaries and cached by summary caching component 280.

Some embodiments of search query input component 230, including its subcomponents cache query component 232 and query summary initiation component 234, utilize search query input component logic 235, stored in storage 225, to access search queries and infer or otherwise determine whether to provide a generated summary from cache or initiate the generation of a summary. In particular, search query input component logic 235 may comprise computer instructions including rules, conditions, associations, classification models, or other criteria for, among other operations, to access search queries and infer or otherwise determine whether to provide a generated summary from cache or initiate the generation of a summary, or any of the embodiments described herein. Search query input component logic 235 may take different forms, depending on the particular information items being determined, accessed, and/or processed. For example, search query input component logic 235 may comprise a set of rules, such as Boolean logic, various decision trees (e.g., random forest, gradient boosted trees, or similar decision algorithms), conditions or other logic, fuzzy logic, neural network, finite state machine, support vector machine, machine-learning techniques, or combinations of these to access search queries and infer or otherwise determine whether to provide a generated summary from cache or initiate the generation of a summary, according to embodiments described herein.

Continuing with FIG. 2, search results component 240, including its subcomponents search results ranking component 242, is generally responsible for determining a set of search results and ranking the set of search results via search results ranking component 242 in response to an input search query to search engine 215. Embodiments of search results component 240 may determine a set of search results and rank the set of search results via search results ranking component 242 based on input search queries to search engine 215 accessed via search query input component 230 and/or contextual data (for example, user data) accessed via contextual data accessing component 262. Thus, information regarding search queries accessed via search query input component and/or contextual data accessed via contextual data accessing component 262 may be accessed by search results component 240 (including its subcomponents) in storage 225. The data generated by search results component 240 (including its subcomponents) may be stored in storage 225, where it may be used by other components or subcomponents of system 200.

Embodiments of search results component 240 determine a set of search results in response to a search query input into search engine 215. For example, search results component 240 searches a database (for example, storage 225) based on the input search query using any known technique (for example, search engine 215 indexes search results by crawling web pages, parsing the web pages to extract content and metadata, and organizing the information as data structures, such as inverted indexes, in a database, such as an index using any known technique to process and understand context, such as NLP to make relevant search results quickly accessible). Embodiments of search results component 240, through search results ranking component 242, may rank a set of search results (for example, websites, images, video, documents, such as news articles, and/or any search results provided by search results component 240) based on the relevance of each of the search results to the input search query using any known technique (for example, PageRank, BERT, and/or any other search algorithm).

Some embodiments of search results component 240, including its subcomponents search results ranking component 242, utilize search results component logic 235, stored in storage 225, to determine a set of search results and rank the set of search results in response to an input search query. In particular, search results component logic 245 may comprise computer instructions including rules, conditions, associations, classification models, or other criteria for, among other operations, to determine a set of search results and rank the set of search results in response to an input search query, or any of the embodiments described herein. Search query input component logic 235 may take different forms, depending on the particular information items being determined, accessed, and/or processed. For example, search results component logic 235 may comprise a set of rules, such as Boolean logic, various decision trees (e.g., random forest, gradient boosted trees, or similar decision algorithms), conditions or other logic, fuzzy logic, neural network, finite state machine, support vector machine, machine-learning techniques, or combinations of these to determine a set of search results and rank the set of search results in response to an input search query, according to embodiments described herein.

Continuing with FIG. 2, snippet component 250, including its subcomponents text snippet component 252, list snippet component 253, multimedia snippet component 254, and snippet qualification component 256, is generally responsible for determining a snippet of information for each of the search results, or a subset of the most relevant search results, based on the relevance of the snippet of information of the search result to the input search query to search engine 215. Embodiments of snippet component 250 may determine a snippet of information for each of the search results, or a subset of the most relevant search results, based on input search queries to search engine 215 accessed via search query input component 230, search results determined via search results component 240, and/or contextual data (for example, user data) accessed via contextual data accessing component 262. Thus, information regarding search queries accessed via search query input component, information regarding search results determined via search results component 240, and/or contextual data accessed via contextual data accessing component 262 may be accessed by snippet component 250 (including its subcomponents) in storage 225. The data generated by snippet component 250 (including its subcomponents) may be stored in storage 225, where it may be used by other components or subcomponents of system 200.

Embodiments of snippet component 250 extracts a snippet of information, such as extracted text from a website, for each of the search results, or a subset of the most relevant search results (for example, the most relevant search result or a threshold number of the most relevant search results, such as the top 20 search results), based on the relevance of the extracted information of the snippet to the input search query. Embodiments of snippet component 250, through text snippet component 252, may determine a snippet of information corresponding to textual data, such as extracted text from a website, for corresponding textual search results based on the relevance of the snippet of information of the search result to the input search query. Embodiments of snippet component 250, through list snippet component 253 of text snippet component 252, may determine a snippet of information corresponding to textual data that include lists, such as an extracted list from a website, for corresponding textual search results based on the relevance of the snippet of information of the search result to the input search query. Embodiments of snippet component 250, through multimedia snippet component 254, may determine a snippet of information corresponding to multimedia data, such as image data, video data audio data, and/or other multimedia data, for corresponding multimedia search results based on the relevance of the snippet of information of the search result to the input search query. For example, multimedia snippet component 254 can determine a snippet of information for a corresponding search result that includes an image extracted from a website using image recognition and analysis techniques, such as though CNNs, metadata associated with the search result, a generative summary of the search result or portion of the search result, such as the output of a different language model summarizing the search result, and/or any data regarding the search result that is stored in the search engine database and/or associated with the search result.

In some implementations, embodiments of snippet component 250 may determine the size(s) of each snippet and/or the number of snippets generated based on the language model 205 that is used to generate the summary of one or more search results. For example, snippet component 250 may determine the size(s) of each snippet and/or the number of snippets generated based on aspects of the language model 205, including cost per use or token size, token constraints, processing speed, and/or any other aspects of the language model 205. In this regard, if the amount of relevant search results provided to the language model 205 to generate a summary of the relevant search results based on the search query is increased, the size of the snippets extracted by snippet component 250 for use by the language model 205 to generate the summary can be decreased to meet token constraints or processing speed requirements. For example, snippet component logic 255 may include a model that optimizes any combination of factors, such as the size of each snippet based on the number of snippets, processing speed, and token constraints to determine the size of the snippet of information for each relevant search result and/or the number of snippets to be used to generate a summary in response to a particular input search query.

Embodiments of snippet component 250, through snippet qualification component 256, may qualify the snippets of information of the search results by determining whether the likelihood of the snippets of information provide an answer to the search query is above a threshold likelihood. For example, in some implementations, the snippets of information determined via snippet component 250 for each of the search results, or a subset of the most relevant search results (for example, the most relevant search result or a threshold number of the most relevant search results, such as the top 20 search results), are provided to snippet qualification component 256, which may include, for example, a transformer encoder model, or other machine learning model, such as a deep learning model, a generative language model, and/or any other models, to qualify the snippets of information of the search results by determining whether the likelihood of the snippets of information provide an answer to the search query is above a threshold likelihood. As a specific example, the snippets of information from the top twenty (20) search results determined via snippet component 250 can be provided to snippet qualification component 256 with the input search query. The snippet qualification component 256 may determine that the snippets of information from five (5) out of the top twenty (20) search results are qualified to provide an answer to the search query. In this regard, the snippets of information from the five (5) qualified search results from the snippet qualification component 256 are used to generate an input prompt via prompt generation component 260 to language model 205 with an instruction to the language model 205 to generate a summary of the snippets of information based on the input search query.

Some embodiments of snippet component 250, including its subcomponents text snippet component 252, list snippet component 253, multimedia snippet component 254, and snippet qualification component 256, utilize snippets component logic 255, stored in storage 225, to determine a snippet of information for each of the search results, or a subset of the most relevant search results, based on an input search query. In particular, snippets component logic 255 may comprise computer instructions including rules, conditions, associations, classification models, or other criteria for, among other operations, to determine a snippet of information for each of the search results, or a subset of the most relevant search results, based on an input search query, or any of the embodiments described herein. Snippets component logic 255 may take different forms, depending on the particular information items being determined, accessed, and/or processed. For example, snippets component logic 255 may comprise a set of rules, such as Boolean logic, various decision trees (e.g., random forest, gradient boosted trees, or similar decision algorithms), conditions or other logic, fuzzy logic, neural network, finite state machine, support vector machine, machine-learning techniques, or combinations of these to determine a snippet of information for each of the search results, or a subset of the most relevant search results, based on an input search query, according to embodiments described herein.

Continuing with FIG. 2, prompt generation component 260, including its subcomponents contextual data accessing component 262, is generally responsible for generating an input prompt to language model 205 with an instruction to the language model to generate a summary of the snippets of information based on the input search query to search engine 215. Embodiments of prompt generation component 260 may generate an input prompt to language model 205 based on input search queries to search engine 215 accessed via search query input component 230, search results determined via search results component 240, snippets of information determined via snippet component 250, and/or contextual data (for example, user data) accessed via contextual data accessing component 262. Thus, information regarding search queries accessed via search query input component, information regarding search results determined via search results component 240, snippets of information determined via snippet component 250, and/or contextual data accessed via contextual data accessing component 262 may be accessed by prompt generation component 260 in storage 225. The data generated by prompt generation component 260 (including its subcomponents) may be stored in storage 225, where it may be used by other components or subcomponents of system 200.

Embodiments of prompt generation component 260 generate an input prompt to language model 205 with an instruction to the language model to generate a summary of the snippets of information based on the input search query to search engine 215. A specific example of an input prompt used via prompt generation component 260 to language model 205 with an instruction to the language model to generate a summary of the snippets of information based on the input search query can include as follows:

```
# Instructions
## Summarize search results and give citations
A user is searching for information online. You are given a user
query and a list of text snippets from web search. Briefly
summarize the search results to answer the user query, in the
same language as the query and text snippets. The summary
should be concise and no more than [[X]] words.
## Formatting
- When appropriate, use markdown format and "**" to highlight
continuous spans of text that directly addresses the query or
contains the main ideas of the summary.
- Always cite the source that supports each statement made in the
summary.
- Only use sources that are useful and ignore the unrelated ones.
- Use "\n\n" at the beginning of a new paragraph.
- [Other minor formatting instructions]
## Examples
Example 1
Query:
[[query 1]]
Snippets from web search:
[1] [[Text snippet 1]]
[2] [[Text snippet 2]]
[3] [[Text snippet 3]]
[4] [[Text snippet 4]]
...
Summary:
[[Statement 1[1][2]. Statement 2[1][3]. Statement 3[2][4]. ...]]
Example 2
...
...
[assistant](#language)
Example X
Query:
[[Placeholder for current query]]
Snippets from web search
[[Placeholder for search snippets]]
Summary:
```

In some embodiments, language model 205 (for example, an LLM, a language model that is fine-tuned to generate a summary of search results via fine-tuning component 290, and/or the like) outputs a generated summary (for example, a natural language summary) based on the input prompt generated via prompt generation component 260 that includes the snippets of information of the search results and the input search query. In this regard, the generated summary can be provided in response to the user based on the input search query via presentation component 270. In embodiments, portions of the generated summary are annotated with citations to the particular search result item that supports the particular portion of the generated summary. For example, each item of a list, groups of items in a list, or an entire list of a generated summary may include a citation with a corresponding link (for example, the URL) of the particular search result item. As another example, each phrase, sentence, and/or group of sentences may include a citation with a corresponding link (for example, the URL) of the particular search result item. In order to generate the citations, an instruction is provided to the language model 205 via prompt generation component 260 to include the citations when generating the summary of the snippets of information based on the input search query.

Embodiments of prompt generation component 260, through contextual data accessing component 262, may provide contextual information to language model 205 in the prompt to generate the summary in order for language model 205 to utilize contextual information to generate a summary of the snippets of information of search results based on the input search query. For example, data regarding the search session, such as previous search queries, search results, and/or generated summaries, may be provided to the language model 205 via prompt generation component 260 through contextual data accessing component 262 to provide additional context when generating the summary. In some embodiments, the contextual information accessed via contextual data accessing component 262 can include information about the user, such as location data, to provide additional context in the prompt to language model 205 when generating the summary. As a specific example, within a search session (or a time frame), a user first searches for flights to Paris in summer 2024. Subsequently and in the same search session, the user asks "What are some sightseeing tips for visiting Paris?" In this specific example, the generated summary that relies on search-session context of the user may include information about large crowds expected to be in Paris in summer 2024 due to the Olympics based on the prior search.

The contextual information accessed via contextual data accessing component 262 can include user data regarding the user inputting the search query into search engine 215. User data, generally, may comprise any information that is related to a person that informs a user about an aspect of that person, and may be received from a variety of sources and may be available in a variety of formats. In some embodiments, user data accessed via contextual data accessing component 262 may be obtained from a data source (such as data source 104*a* in FIG. 1, which may be a social networking site, a professional networking site, a corporate network, an organization intranet or file share, or other data source containing user data) or determined via one or more sensors (such as sensors 103*a* and 107 of FIG. 1), which may be on or associated with one or more user devices (such as user device 102*a*), servers (such as server 106), and/or other computing devices. As used herein, a sensor may include a function, routine, component, or combination thereof for sensing, detecting, or otherwise obtaining information such as user data from a data source 104*a*, and may be embodied as hardware, software, or both. By way of example and not limitation, user data may include data that is sensed, detected, or determined from one or more sensors (referred to herein as sensor data), such as location information of mobile device(s), properties or characteristics of the user device(s), user activity information (for example: app usage; online activity; searches; voice data such as automatic speech recognition; activity logs; communications data, including calls, texts, chats, messages, and emails; document comments; website posts; other user data associated with communication events, including user history, session logs, application data, contacts data, calendar and schedule data, notification data, social network data, ecommerce activity, user account(s) data (which may include data from user preferences or settings associated with a personalization-related application, a personal assistant application or service, an online service or cloud-based account such as Microsoft 365, an entertainment or streaming media account, a purchasing club or services, and/or others); global positioning system (GPS) data; other user device data (which may include device settings, profiles, network-related information, payment or credit card usage data, or purchase history data); other sensor data that may be sensed or otherwise detected by a sensor (or other detector) component(s), including data derived from a sensor component associated with the user (including location, motion, orientation, position, user access, user activity, network-access, user device charging, or other data that is capable of being provided by one or more sensor component); data derived based on other data (for example, location data that can be derived from Wi-Fi, cellular network, or IP address data); and nearly any other source of data that may be sensed, detected, or determined as described herein. In some respects, user data may be provided in user data streams or signals. A "user signal" can be a feed or stream of user data from a corresponding data source. For example, a user signal could be from a smartphone, a home sensor device, a GPS device (e.g., for location coordinates), a vehicle sensor device, a wearable device, a user device, a gyroscope sensor, an accelerometer sensor, a calendar service, an email account, a credit card account, or other data sources. In some embodiments, contextual data accessing component 262 receives or accesses data continuously, periodically, as it becomes available, or as needed. In some embodiments, the user data may be received by contextual data accessing component 262 and stored in storage 225.

Some embodiments of prompt generation component 260, including its subcomponents contextual data accessing component 262, utilize prompt generation component logic 265, stored in storage 225, to generate an input prompt to language model 205. In particular, prompt generation component logic 265 may comprise computer instructions including rules, conditions, associations, classification models, or other criteria for, among other operations, to generate an input prompt to language model 205, or any of the embodiments described herein. Prompt generation component logic 265 may take different forms, depending on the particular information items being determined, accessed, and/or processed. For example, prompt generation component logic 265 may comprise a set of rules, such as Boolean logic, various decision trees (e.g., random forest, gradient boosted trees, or similar decision algorithms), conditions or other logic, fuzzy logic, neural network, finite state machine, support vector machine, machine-learning techniques, or combinations of these to generate an input prompt to language model 205, according to embodiments described herein.

Continuing with FIG. 2, presentation component 270, including its subcomponents UI rendering component 272 and hover response component 274, is generally responsible for displaying the generated summary of search results from language model 205 to the user in response to the search query. The generated summary of search results may be presented via one or more presentation components 616, as described in FIG. 6. Embodiments of presentation component 270 may display the generated summary of search results from language model 205 and search results based on input search queries to search engine 215 accessed via search query input component 230, search results determined via search results component 240, snippets of information determined via snippet component 250, information generated by prompt generation component 260, the summary generated by language model 205, and/or contextual data (for example, user data) accessed via contextual data accessing component 262. Thus, information regarding search queries accessed via search query input component, information regarding search results determined via search results component 240, snippets of information determined via snippet component 250, information generated by prompt generation component 260, the summary generated by language model 205, and/or contextual data accessed via contextual data accessing component 262 may be accessed by presentation component 270 in storage 225. The data generated by presentation component 270 (including its subcomponents) may be stored in storage 225, where it may be used by other components or subcomponents of system 200.

Embodiments of presentation component 270 display the generated summary of search results from language model 205 to the user in response to the search query via the search engine 215. Embodiments of presentation component 270 display portions of the generated summary annotated with citations to the particular search result item that supports the particular portion of the generated summary. For example, each item of a list, groups of items in a list, or an entire list of a generated summary may be displayed by presentation component 270, including a citation with a corresponding link (for example, the URL) of the particular search result item. As another example, each phrase, sentence, and/or group of sentences may be displayed by presentation component 270, including a citation with a corresponding link (for example, the URL) of the particular search result item.

In some implementations, a generated summary annotated with citations to each search result may be assembled and formatted for presentation to the user via presentation component 270 through a UI element. Examples of such a UI element are further described in connection with FIGS. 3A, 3B, 3C, 3D, 3E, 3F, and 3G. In some implementations, the generated summary annotated with each search result may be assembled and formatted or prepared for presentation to the user via presentation component 270 through a UI element including a list of items. Examples of such a UI element are further described in connection with FIGS. 3A-3C and 3F-3G. In some implementations, the generated summary annotated with each search result may be assembled and formatted or prepared for presentation to the user via presentation component 270 through a UI element implemented by hover response component 274 that responds to a user hovering over a portion of the generated summary by providing a corresponding source (e.g., a URL of the website from which the portion of the generated summary was determined by the language model) for the portion of the generated summary. Examples of such a UI element implemented by hover response component 274 are further described in connection with FIGS. 3A-3G.

In some implementations, the generated summary annotated with each search result may be assembled and formatted or prepared for presentation to the user via presentation component 270 through a UI element including an image(s). One example of such a UI element is further described in connection with FIGS. 3F and 3G. In some implementations, the generated summary annotated with each search result may be assembled and formatted or prepared for presentation to the user via presentation component 270 through a UI element, including the cited search results below the summary (for example, including links to each of the search results, titles, snippets of information, extracted images, and/or the like) in order to enable the user to easily view the sources of the generated summary. Examples of such a UI element are further described in connection with FIGS. 3A-3G. In some implementations, the generated summary annotated with each search result may be assembled and formatted or prepared for presentation to the user via presentation component 270 through a UI element, including the cited search results in the summary (for example, including links to each of the search results, titles, snippets of information, extracted images, and/or the like). Examples of such a UI element are further described in connection with FIGS. 3A and 3B.

In some embodiments, the generated summary is provided by presentation component 270 in a delineated space of the UI element. For example, the generated summary annotated with each search result may be assembled and formatted or prepared for presentation to the user via presentation component 270 through a UI element in a delineated space on the web page, including the cited search results below the summary. Examples of such a UI element are further described in connection with FIGS. 3A-3G. In some embodiments, an instruction is provided by prompt generation component 260 to the language model 205 to generate a short answer, in addition to generating the summary of the snippets of information, based on the input search query. In some implementations, the short answer generated by language model 205 in response to the input search query is provided by presentation component 270 in a delineated space of the UI element. For example, the generated summary annotated with each search result may be assembled and formatted or prepared for presentation to the user via presentation component 270 through a UI element in a delineated space on the web page including the cited search results below the summary and a short answer generated by the language model may be in a corresponding delineated space within the delineated space of the generated summary. Examples of such a UI element are further described in connection with FIGS. 3D-3E.

In some embodiments, presentation component 270 may provide an initial summary of the snippets of information of search results generated by language model 205 and additional summaries of related snippets of information of search results generated by language model 205 (for example, based on contextual information, such as previous search history of other users). For example, the language model 205 generates an initial summary of search results in response to the search query. The language model 205 also generates additional related summaries of related search results and corresponding topics of the related summaries. Presentation component 270 may provide the initial summary in the UI in response to the search query and the corresponding topics of the related summaries. The user can then select the related topic through the UI to view the related summary.

Embodiments of presentation component 270, through UI rendering component 272, may render the portion of the web page providing the generated summary after the portion of the web page providing the search results is rendered (for example, when the latency in providing the generated summary is above a threshold amount of time). For example, in some implementations, presentation component 270 displays the delineated space for the generated summary in the UI (and/or other corresponding data of the generated summary, such as a citation(s), an image(s), a short answer, and/or the like) and presentation component 270 displays the search results below the delineated space in the UI. In this regard, the portion of the UI providing the search results can be rendered by presentation component 270 for display to the user while the language model is still generating the summary in order to optimize presentation of a response to the search query and improve the user experience. Subsequently, the generated summary can be rendered by presentation component 270 for display to the user in the delineated space of the UI to provide the generated summary to the user. In some embodiments, an indication can be provided by presentation component 270 in the delineated space indicating to the user that the generated summary is still loading before the generated summary is rendered in the delineated space. For example, in some implementations, presentation component 270 renders a loading bar via a UI element while the generated summary is generated before the generated summary is rendered via presentation component 270. As another example, in some implementations, presentation component 270 provides an extracted key phrase (e.g., via a deep learning model or other machine learning model with lower latency than the language model used to generate the generated summary) while the generated summary is generated before the generated summary is rendered on the UI via presentation component 270.

Some embodiments of presentation component 270, including its subcomponents UI rendering component 272 and hover response component 274, utilize presentation component logic 275, stored in storage 225, to display the generated summary to the user in response to the search query. In particular, presentation component logic 275 may comprise computer instructions including rules, conditions, associations, classification models, or other criteria for, among other operations, to display the generated summary to the user in response to the search query, or any of the embodiments described herein. Presentation component logic 275 may take different forms, depending on the particular information items being determined, accessed, and/or processed. For example, presentation component logic 275 may comprise a set of rules, such as Boolean logic, various decision trees (e.g., random forest, gradient boosted trees, or similar decision algorithms), conditions or other logic, fuzzy logic, neural network, finite state machine, support vector machine, machine-learning techniques, or combinations of these to display the generated summary to the user in response to the search query, according to embodiments described herein.

Continuing with FIG. 2, summary caching component 280, including its subcomponents cached summary updating component 282, is generally responsible for caching the generated summary of search results from language model 205 with respect to the corresponding search query in order to provide the generated summary in response to similar search queries in the future. Embodiments of summary caching component 280 may cache the generated summary of search results based on input search queries to search engine 215 accessed via search query input component 230, search results determined via search results component 240, snippets of information determined via snippet component 250, information generated by prompt generation component 260, the summary generated by language model 205, the generated summary as presented by presentation component 270, and/or contextual data (for example, user data) accessed via contextual data accessing component 262. Thus, information regarding search queries accessed via search query input component, information regarding search results determined via search results component 240, snippets of information determined via snippet component 250, information generated by prompt generation component 260, the summary generated by language model 205, the generated summary as presented by presentation component 270, and/or contextual data accessed via contextual data accessing component 262 may be accessed by summary caching component 280 in storage 225. The data generated by summary caching component 280 (including its subcomponents) may be stored in storage 225, where it may be used by other components or subcomponents of system 200.

Embodiments of summary caching component 280 cache (for example, stored as cache in storage 225) the generated summary provided in response to the user's input search query in order to provide the generated summary in response to similar search queries in the future and/or for use in other application contexts (for example, various applications by Microsoft® may access generated summaries from input search queries into BING® by Microsoft®). For example, the generated summary is cached by summary caching component 280, along with the input search query, and provided in response to future input search queries that are semantically similar to the input search query that was used to generate the summary as determined via cache query component 232. In this regard, in some implementations, the cached generated summary can be rendered via presentation component 270 with the search results in the search engine UI as the cached generated summary can be provided in near real-time to a subsequent similar input search query. In some embodiments, summaries are generated prompt generation component 260 using language 205 for historical search queries and cached (for example, immediately after receiving a search query and/or a threshold number of similar search queries, offline, and/or when the LLM cost is lower, such as non-peak times) via summary caching component 280. In this regard, the generated summary is cached via summary caching component 280 so that the generated summary can be provided by presentation component 270 in near real-time in response to a future input search query that is similar to the historical search query that was used to generate the generated summary. Embodiments of summary caching component 280, through cached summary updating component 282, may update the cached generated summaries based on the corresponding search queries used to generate the summary periodically (for example, weekly) by generating a new generated summary and caching the new generated summary with respect to the corresponding search query.

Some embodiments of summary caching component 280, including its subcomponents cached summary updating component 282, utilize summary caching component logic 285, stored in storage 225, to cache the generated summary with respect to the corresponding search query. In particular, summary caching component logic 285 may comprise computer instructions including rules, conditions, associations, classification models, or other criteria for, among other operations, to cache the generated summary with respect to the corresponding search query, or any of the embodiments described herein. Summary caching component logic 285 may take different forms, depending on the particular information items being determined, accessed, and/or processed. For example, summary caching component logic 285 may comprise a set of rules, such as Boolean logic, various decision trees (e.g., random forest, gradient boosted trees, or similar decision algorithms), conditions or other logic, fuzzy logic, neural network, finite state machine, support vector machine, machine-learning techniques, or combinations of these to cache the generated summary with respect to the corresponding search query, according to embodiments described herein.

Continuing with FIG. 2, fine-tuning component 290 is generally responsible for fine-tuning a language model (for example, embodiments of language model 205) to generate summaries of search results based on corresponding input search queries to search engine 215. Embodiments of fine-tuning component 290 fine-tune a language model to generate summaries of search results based on input search queries to search engine 215 accessed via search query input component 230, search results determined via search results component 240, snippets of information determined via snippet component 250, information generated by prompt generation component 260, the summary generated by language model 205, the generated summary as presented by presentation component 270, cached generated summaries by summary caching component 280, and/or contextual data (for example, user data) accessed via contextual data accessing component 262. Thus, information regarding search queries accessed via search query input component, information regarding search results determined via search results component 240, snippets of information determined via snippet component 250, information generated by prompt generation component 260, the summary generated by language model 205, the generated summary as presented by presentation component 270, cached generated summaries by summary caching component 280, and/or contextual data accessed via contextual data accessing component 262 may be accessed by summary caching component 280 in storage 225. The training data and/or fine-tuned language model embeddings determined by fine-tuning component 290 may be stored in storage 225, where it may be used by other components or subcomponents of system 200.

Embodiments of fine-tuning component 290 may fine-tune a language model to generate summaries of search results based on input search queries to search engine 215. For example, an LLM (for example, embodiments of language model 205) can be utilized to generate summaries of the snippets of information of search results based on historical search queries by prompt generation component 260 to generate training data. The training data can be stored in storage 225. The training data (for example, the summaries generated by the LLM, the snippets of information of search results, and the input search queries) can be used by fine-tuning component 290 to fine-tune a language model (for example, embodiments of language model 205) to generate summaries of the snippets of information of search results based on input search queries.

Some embodiments of fine-tuning component 290 utilize fine-tuning component logic 295 stored in storage 225 to fine-tune a language model to generate summaries of search results based on input search queries. In particular, fine-tuning component logic 295 may comprise computer instructions including rules, conditions, associations, classification models, or other criteria for, among other operations, fine-tuning a language model to generate summaries of search results based on input search queries. Fine-tuning component logic 295 may take different forms, depending on the particular information items being determined, extracted, and/or processed. For example, fine-tuning component logic 295 may comprise a set of rules, such as Boolean logic, various decision trees (e.g., random forest, gradient boosted trees, or similar decision algorithms), conditions or other logic, fuzzy logic, neural network, finite state machine, support vector machine, machine-learning techniques, such as a language model, or combinations of these to fine-tune a language model to generate summaries of search results based on input search queries, according to embodiments described herein.

With reference now to FIGS. 3A-3G, example schematic screenshots from a personal computing device are illustratively depicted, showing aspects of example graphical user interfaces that include presentation of a summary of search results generated by a language model, as described herein. The generated summary of search results as shown in FIGS. 3A-3G may be determined in response to a search query, such as described in connection with the components of system 200 of FIG. 2. The example generated summaries of search results, as well as the formatting, assembly, or presentation may be determined as described in connection presentation component 270 of FIG. 2.

With reference to FIG. 3A, an example screen display 300A is shown, which may be presented via a computing device, such as user device **102*n*, discussed above with respect to FIG. 1. Example screen display 300A depicts a UI showing aspects of a generated summary of search results. This example screen display 300A** may be presented to a user in response to a search query, for example, via a search engine platform accessed via a browser.

As shown in example screen display 300A, a search query is input by the user ("what do I need to travel") and a summary is generated by a language model in a UI in response to the search query, along with search results. As can be understood, the generated summary includes a generated list, along with corresponding citations to URLs, where each of the portions of the generated summary were identified by the language model. In this regard, a user can select the corresponding URL to navigate to the URL. Further, as can be understood, the language model provides additional follow-up queries for the user based on contextual information, such as previous searches by other users.

With reference to FIG. 3B, an example screen display 300B is shown, which may be presented via a computing device, such as user device **102*n*, discussed above with respect to FIG. 1. Example screen display 300B depicts a UI showing aspects of a generated summary of search results following a hover action by the user in the UI of example screen display 300A of FIG. 3A. As shown in example screen display 300B**, in response to a hover action over a portion of the generated summary, the corresponding URLs of the sources of information are displayed to the user. The user can then select a corresponding URL to navigate to the corresponding URL.

With reference to FIG. 3C, an example screen display 300C is shown, which may be presented via a computing device, such as user device **102*n*, discussed above with respect to FIG. 1. Example screen display 300C depicts a UI showing aspects of a generated summary of search results following a hover action by the user in the UI of example screen display 300A of FIG. 3A. As shown in example screen display 300C, in response to a hover action over a portion of the generated summary (for example, different than the portion of the generated summary of FIG. 3B**), the corresponding URLs of the sources of information are displayed to the user. The user can then select a corresponding URL to navigate to the corresponding URL.

Figure 3D:
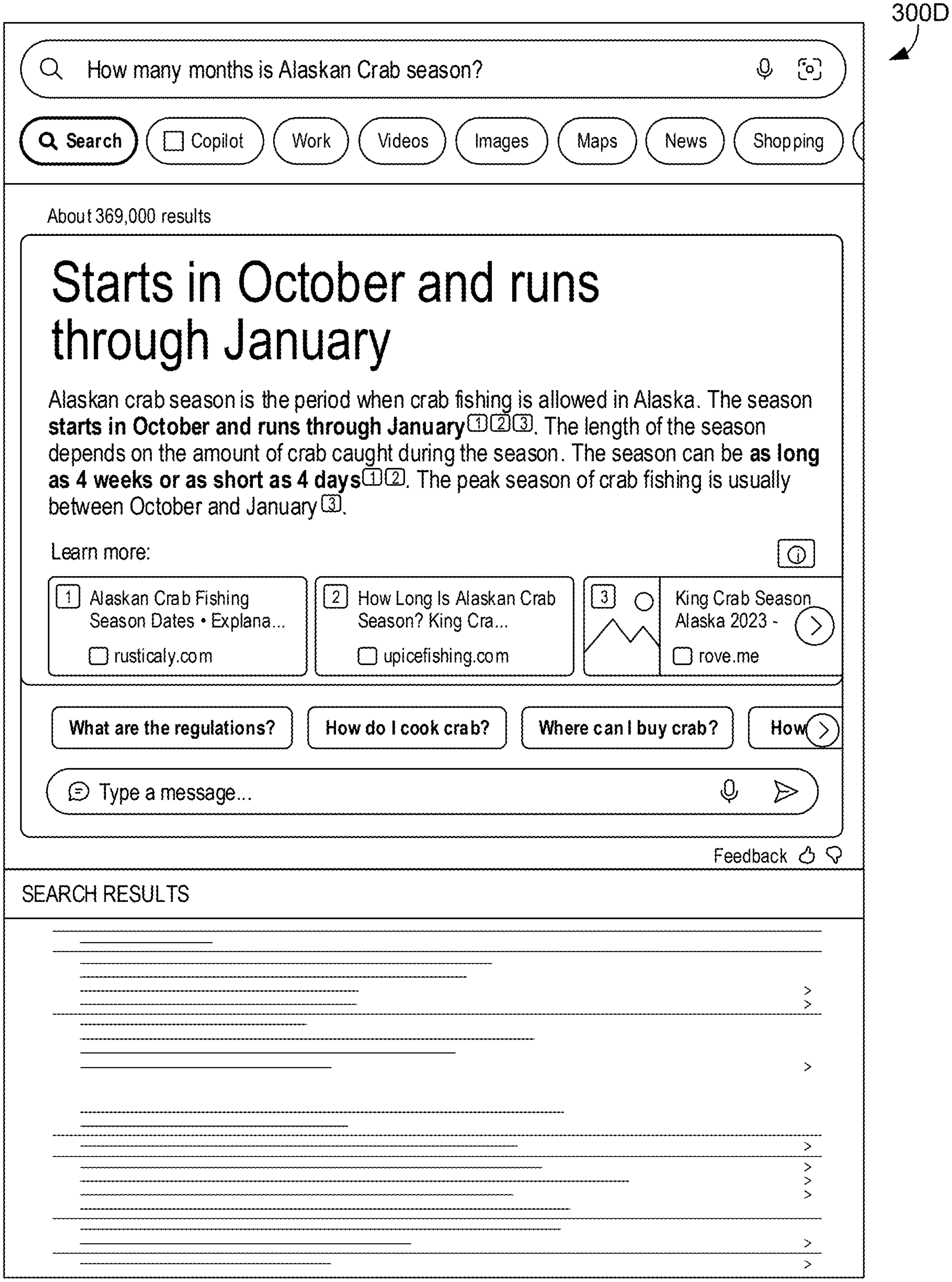

With reference to FIG. 3D, an example screen display 300D is shown, which may be presented via a computing device, such as user device **102*n*, discussed above with respect to FIG. 1. Example screen display 300D depicts a UI showing aspects of a generated summary of search results. This example screen display 300D** may be presented to a user in response to a search query, for example, via a search engine platform accessed via a browser.

As shown in example screen display 300D, a search query is input by the user ("How many months is Alaskan Crab season?") and a summary is generated by a language model in a UI in response to the search query, along with search results. As can be understood, the generated summary includes a natural language summary, along with corresponding citations to URLs, where each of the portions of the generated summary were identified by the language model. In this regard, a user can select the corresponding URL to navigate to the URL. Further, as can be understood, the language model provides additional follow-up queries for the user based on contextual information, such as previous searches by other users. Even further, the language model provides a short answer ("Starts in October and runs through January") in response to the search query.

Figure 3E:
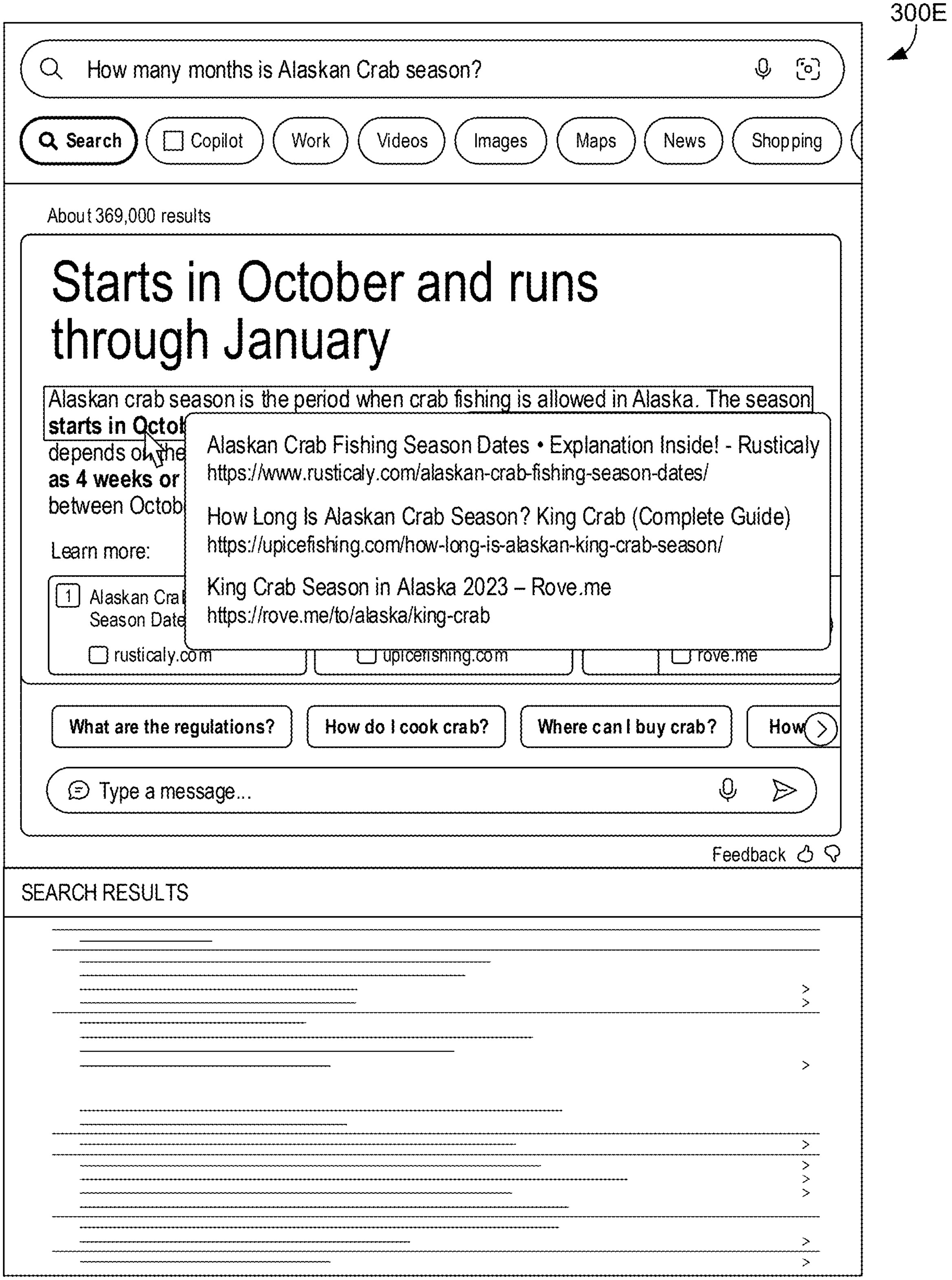

With reference to FIG. 3E, an example screen display 300E is shown, which may be presented via a computing device, such as user device 102*n*, discussed above with respect to FIG. 1. Example screen display 300E depicts a UI showing aspects of a generated summary of search results following a hover action by the user in the UI of example screen display 300D of FIG. 3D. As shown in example screen display 300E, in response to a hover action over a portion of the generated summary, the corresponding URLs of the sources of information are displayed to the user. The user can then select a corresponding URL to navigate to the corresponding URL.

With reference to FIG. 3F, an example screen display 300F is shown, which may be presented via a computing device, such as user device 102*n*, discussed above with respect to FIG. 1. Example screen display 300F depicts a UI showing aspects of a generated summary of search results. This example screen display 300F may be presented to a user in response to search query, for example, via a search engine platform accessed via a browser.

As shown in example screen display 300F, a search query is input by the user ("what do I need to travel abroad") and a summary is generated by a language model in a UI in response to the search query, along with search results. As can be understood, the generated summary includes a generated list, along with corresponding citations to URLs, where each of the portions of the generated summary were identified by the language model. In this regard, a user can select the corresponding URL to navigate to the URL. Further, as can be understood, the language model provides additional follow-up queries for the user based on contextual information, such as previous searches by other users. Even further, the language model provides an image in response to the search query.

With reference to FIG. 3G, an example screen display 300G is shown, which may be presented via a computing device, such as user device 102*n*, discussed above with respect to FIG. 1. Example screen display 300G depicts a UI showing aspects of a generated summary of search results following a hover action by the user in the UI of example screen display 300F of FIG. 3F. As shown in example screen display 300G, in response to a hover action over the image of the generated summary, the corresponding URL of the source of the image is displayed to the user. The user can then select the corresponding URL to navigate to the corresponding URL.

Figure 5:
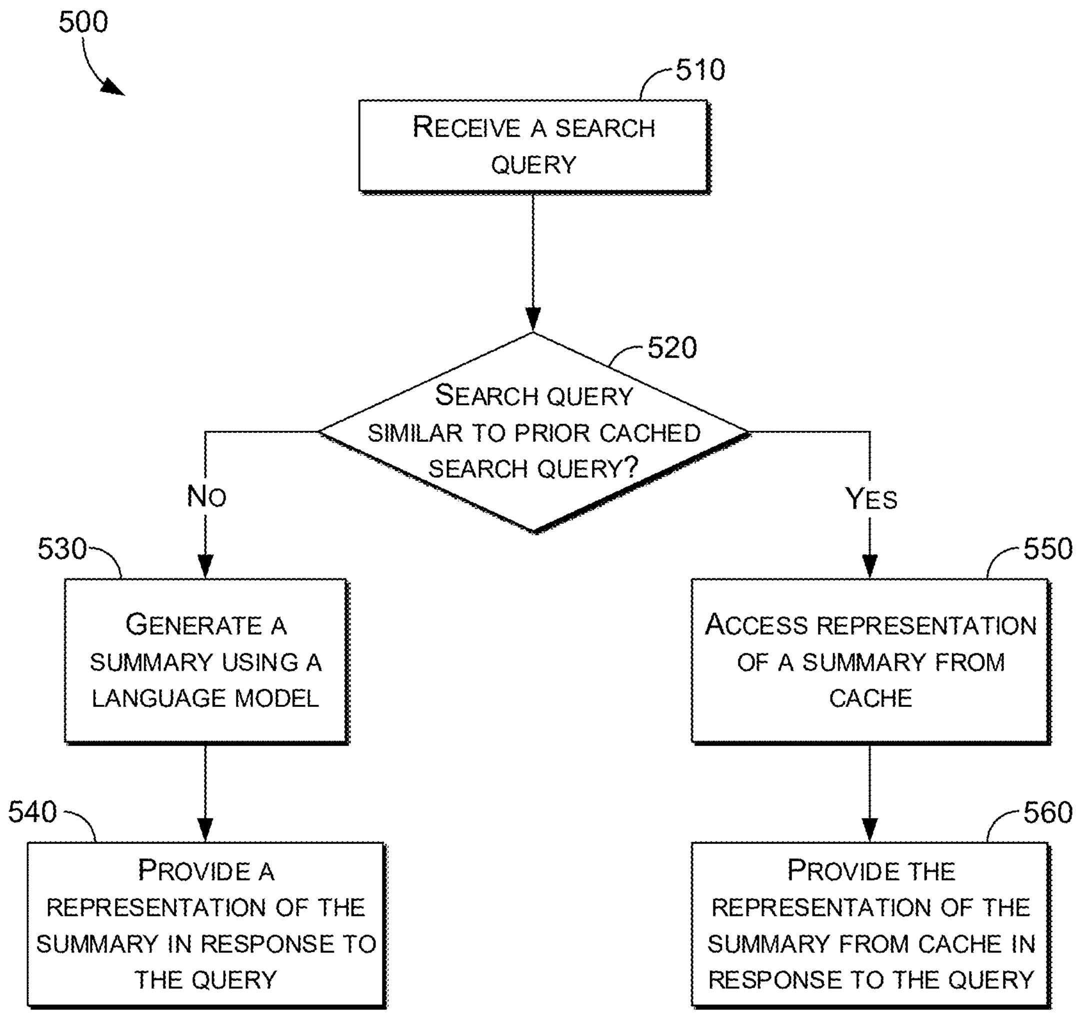

Turning now to FIGS. 4 and 5, aspects of an example process flows 400 and 500 are illustratively depicted for some embodiments of the disclosure. Process flows 400 and 500 each may comprise a method (sometimes referred to herein as method 400 and method 500) that may be carried out to implement various example embodiments described herein. For instance, process flow 400 or process flow 500 may be performed to programmatically generate a summary of search results by a language model in real-time based on the corresponding relevance of the search results to an input search query, which may be used to provide any of the improved electronic search engine technology or enhanced user computing experiences described herein.

Each block or step of process flow 400, process flow 500, and other methods described herein comprises a computing process that may be performed using any combination of hardware, firmware, and/or software. For instance, various functions may be carried out by a processor executing instructions stored in memory, such as memory 612 described in FIG. 6 and/or storage 225 described in FIG. 2. The methods may also be embodied as computer-usable instructions stored on computer storage media. The methods may be provided by a stand-alone application, a service or hosted service (stand-alone or in combination with another hosted service), or a plug-in to another product, to name a few. The blocks of process flow 400 and 500 that correspond to actions (or steps) to be performed (as opposed to information to be processed or acted on) may be carried out by one or more computer applications or services, in some embodiments, which may operate on one or more user devices (such as user device 102*a*), servers (such as server 106), and may be distributed across multiple user devices, and/or servers, or by a distributed computing platform, and/or may be implemented in the cloud, such as described in connection with FIG. 7. In some embodiments, the functions performed by the blocks or steps of process flows 400 and 500 are carried out by components of system 200, described in connection to FIG. 2.

With reference to FIG. 4, aspects of example process flow 400 are illustratively provided for programmatically generating a summary of search results by a language model based on the corresponding relevance of the search results to an input search query. In particular, example process flow 400 may be performed to generate a summary of search results in response to a search query, as described in connection with FIG. 2.

At block 410, method 400 includes receiving a search query. Some embodiments of block 410 comprise a user inputting a search query (for example, a user inputs a natural language question as the search query) into a search engine. In one embodiment, the UI is presented in a search engine application such as Bing® by Microsoft®.

Embodiments of block 410 may be carried out using search engine 215 (FIG. 2) and/or search query input component 230 (FIG. 2), in some implementations. Additional details of embodiments of block 410, or for carrying out operations of block 410, are described in connection to FIG. 2, and in particular search engine 215 and search query input component 230. Moreover, examples of input search queries according to some embodiments of block 410 are illustratively depicted in FIGS. 3A-3G and described further in connection with the drawings.

At block 420, method 400 includes determining a set of search results. Some embodiments of block 420 comprise the search engine searching a database based on the input search query using any known technique (for example, a search engine indexes search results by crawling web pages, parsing the web pages to extract content and metadata, and organizing the information as data structures, such as inverted indexes, in a database, such as an index using any known technique to process and understand context, such as NLP, to make relevant search results quickly accessible). The search engine determines and ranks a set of search results (for example, websites, images, video, documents, such as news articles, and/or any search results provided by a search engine) based on the relevance of each of the search results to the input search query using any known technique (for example, PageRank, BERT, and/or any other search algorithm).

Embodiments of block 420 may be carried out using search engine 215 (FIG. 2), search query input component 230, and/or search results component 240 (FIG. 2), in some implementations. Additional details of embodiments of block 420, or for carrying out operations of block 420, are described in connection to FIG. 2, and in particular search engine 215, search query input component 230, and search results component 240. Moreover, examples of input search queries and search results according to some embodiments of block 420 are illustratively depicted in FIGS. 3A-3G and described further in connection with the drawings.

At block 430, method 400 includes determining a set of snippets where each snippet corresponds to each search result. Some embodiments of block 430 comprise that a snippet of information, such as extracted text from a website, is extracted from each of the search results, or a subset of the most relevant search results (for example, the most relevant search result or a threshold number of the most relevant search results, such as the top 20 search results), based on the relevance of the extracted information of the snippet to the input search query. In some implementations, the snippet of information can be based on any information stored in the search engine database regarding the search result. For example, the snippet of information can include extracted data from the search result, such as text data of the search result, image data of the search result (for example, image data extracted using image recognition and analysis techniques, such as through CNNs), metadata associated with the search result, a generative summary of the search result or portion of the search result, such as the output of a different language model summarizing the search result, and/or any data regarding the search result that is stored in the search engine database and/or associated with the search result. In some implementations, the snippet of information can correspond to a list of items, such as a list of items provided on a website.

Some embodiments of block 430 comprise that the size(s) of each snippet and/or the number of snippets generated is determined based on the language model that is used to generate the summary of one or more search results. For example, the size(s) of each snippet and/or the number of snippets generated can be determined based on aspects of the language model, including cost per use or token size, token constraints, processing speed, and/or any other aspects of the language model. In this regard, if the amount of relevant search results provided to the language model to generate a summary of the relevant search results based on the search query is increased, the size of the snippets used by the language model to generate the summary can be decreased to meet token constraints or processing speed requirements. For example, snippet generation logic (for example, a model that optimizes any combination of factors, such as the size of each snippet based on the number of snippets, processing speed, and token constraints) is used to determine the size of the snippet of information for each relevant search result and/or the number of snippets to be used to generate a summary in response to a particular input search query.

Some embodiments of block 430 comprise that the snippets of information for each of the search results, or a subset of the most relevant search results (for example, the most relevant search result or a threshold number of the most relevant search results, such as the top 20 search results), are used to generate an input prompt to a language model with an instruction to the language model to generate a summary of the snippets of information based on the input search query. In some implementations, the snippets of information for each of the search results, or a subset of the most relevant search results (for example, the most relevant search result or a threshold number of the most relevant search results, such as the top 20 search results), are provided to a snippet qualifying model (for example, a transformer encoder model, or other machine learning model, such as a deep learning model, a generative language model, and/or any other models) to qualify the snippets of information of the search results by determining whether the likelihood of the snippets of information providing an answer to the search query is above a threshold likelihood. As a specific example, the snippets of information from the top twenty (20) search results can be provided to the snippet qualifying model with the input search query. The snippet qualifying model may determine that the snippets of information from five (5) out of the top twenty (20) search results are qualified to provide an answer to the search query. In this regard, the snippets of information from the five (5) qualified search results are used to generate an input prompt to a language model with an instruction to the language model to generate a summary of the snippets of information based on the input search query.

Embodiments of block 430 may be carried out using search engine 215 (FIG. 2), search query input component 230, search results component 240 (FIG. 2), and/or snippet component 250 (FIG. 2), in some implementations. Additional details of embodiments of block 430, or for carrying out operations of block 430, are described in connection to FIG. 2, and in particular search engine 215, search query input component 230, search results component 240, and snippet component 250. Moreover, examples of input search queries and summaries generated based on snippets according to some embodiments of block 430 are illustratively depicted in FIGS. 3A-3G and described further in connection with the drawings.

At block 440, method 400 includes generating a language model input prompt based on the set of snippets and including an instruction in the language model input prompt to generate a summary based on the snippets. Some embodiments of block 440 comprise that the snippets of information for each of the search results, a subset of the most relevant search results, and/or a qualified set of snippets, are used to generate an input prompt to a language model with an instruction to the language model to generate a summary of the snippets of information based on the input search query.

Some embodiments of block 440 comprise that the language model utilizes contextual information to generate a summary of the snippets of information of search results based on the input search query. For example, data regarding the search session, such as previous search queries, search results, and/or generated summaries, may be provided to the language model to provide additional context when generating the summary. In some embodiments, the contextual information can include information about the user, such as location data, to provide additional context when generating the summary.

Embodiments of block 440 may be carried out using search engine 215 (FIG. 2), search query input component 230, search results component 240 (FIG. 2), snippet component 250 (FIG. 2), and/or prompt generation component 260 (FIG. 2), in some implementations. Additional details of embodiments of block 440, or for carrying out operations of block 440, are described in connection to FIG. 2, and in particular search engine 215, search query input component 230, search results component 240, snippet component 250, and prompt generation component 260. Moreover, examples of input search queries and summaries generated based on snippets according to some embodiments of block 440 are illustratively depicted in FIGS. 3A-3G and described further in connection with the drawings.

At block 450, method 400 includes providing the language model input prompt to the language model and receiving output generated by the language model in response to the input prompt. Some embodiments of block 450 comprise that the language model that is utilized to generate a summary of the snippets of information of search results based on the input search query is an LLM (for example, GPT and/or the like). Some embodiments of block 450 comprise that the language model that is utilized to generate a summary of the snippets of information based on the input search query is a language model (for example, a language model that is smaller than a corresponding LLM) that is fine-tuned for generating summaries of the snippets of information of search results based on input search queries. For example, an LLM can be utilized to generate summaries of the snippets of information of search results based on input search queries as training data. The training data (for example, the summaries generated by the LLM, the snippets of information of search results, and the input search queries) can be used to fine-tune a language model to generate summaries of the snippets of information of search results based on input search queries.

Some embodiments of block 450 comprise that the language model (for example, an LLM, a language model that is fine-tuned to generate a summary of search results, and/or the like) outputs a generated summary (for example, a natural language summary) based on the input prompt that includes the snippets of information of the search results and the input search query.

Embodiments of block 450 may be carried out using search engine 215 (FIG. 2), search query input component 230, search results component 240 (FIG. 2), snippet component 250 (FIG. 2), prompt generation component 260 (FIG. 2), presentation component 270 (FIG. 2), and/or fine-tuning component 290 (FIG. 2), in some implementations. Additional details of embodiments of block 450, or for carrying out operations of block 450, are described in connection to FIG. 2, and in particular search engine 215, search query input component 230, search results component 240, snippet component 250, prompt generation component 260, presentation component 270, and fine-tuning component 290. Moreover, examples of input search queries and summaries generated based on snippets according to some embodiments of block 450 are illustratively depicted in FIGS. 3A-3G and described further in connection with the drawings.

At block 460, method 400 includes providing a representation of a summary based on the output of the language model in response to the search query. Some embodiments of block 460 comprise that portions of the generated summary are annotated with citations to the particular search result item that supports the particular portion of the generated summary. For example, each item of a list, groups of items in a list, or an entire list of a generated summary may include a citation with a corresponding link (for example, the URL) of the particular search result item. As another example, each phrase, sentence, and/or group of sentences may include a citation with a corresponding link (for example, the URL) of the particular search result item. In order to generate the citations, an instruction is provided to the language model to include the citations when generating the summary of the snippets of information based on the input search query.

Some embodiments of block 460 comprise that the generated summary annotated with citations to each search result may be assembled and formatted or prepared for presentation to the user via a UI element. Examples of such a UI element are further described in connection with FIGS. 3A-3G. Some embodiments of block 460 comprise that the generated summary annotated with each search result may be assembled and formatted or prepared for presentation to the user via a UI element including a list of items. Examples of such a UI element are further described in connection with FIGS. 3A-3C and 3F-3G. Some embodiments of block 460 comprise that the generated summary annotated with each search result may be assembled and formatted or prepared for presentation to the user via a UI element that responds to a user hovering over a portion of the generated summary by providing a corresponding source (e.g., a URL of the website from which the portion of the generated summary was determined by the language model) for the portion of the generated summary. Examples of such a UI element are further described in connection with FIGS. 3A-3G.

Some embodiments of block 460 comprise that the generated summary annotated with each search result may be assembled and formatted or prepared for presentation to the user via a UI element including an image(s). One example of such a UI element is further described in connection with FIGS. 3F and 3G. Some embodiments of block 460 comprise that the generated summary annotated with each search result may be assembled and formatted or prepared for presentation to the user via a UI element including the cited search results below the summary (for example, including links to each of the search results, titles, snippets of information, extracted images, and/or the like) in order to enable the user to easily view the sources of the generated summary. Examples of such a UI element are further described in connection with FIGS. 3A-3G. Some embodiments of block 460 comprise that the generated summary annotated with each search result may be assembled and formatted or prepared for presentation to the user via a UI element including the cited search results in the summary (for example, including links to each of the search results, titles, snippets of information, extracted images, and/or the like). Examples of such a UI element are further described in connection with FIGS. 3A and 3B.

Some embodiments of block 460 comprise that the generated summary is located in a delineated space of the UI element. For example, the generated summary annotated with each search result may be assembled and formatted or prepared for presentation to the user via a UI element in a delineated space on the web page including the cited search results below the summary. Examples of such a UI element are further described in connection with FIGS. 3A-3G. Some embodiments of block 460 comprise that an instruction is provided to the language model to generate a short answer, in addition to generating the summary of the snippets of information, based on the input search query. The short answer generated by the language model in response to the input search query is located in a delineated space of the UI element. For example, the generated summary annotated with each search result may be assembled and formatted or prepared for presentation to the user via a UI element in a delineated space on the web page, including the cited search results below the summary and a short answer generated by the language model, may be in a corresponding delineated space within the delineated space of the generated summary. Examples of such a UI element are further described in connection with FIGS. 3D-3E.

Some embodiments of block 460 comprise that the portion of the web page providing the generated summary is rendered after the portion of the web page providing the search results is rendered (for example, when the latency in providing the generated summary is above a threshold amount of time). For example, in some implementations, the UI of the search engine provides a delineated space for the generated summary (and/or other corresponding data of the generated summary, such as a citation(s), an image(s), a short answer, and/or the like) and the UI provides search results below the delineated space. In this regard, the portion of the UI providing the search results can be rendered while the language model is still generating the summary in order to optimize presentation of a response to the search query and improve the user experience. Subsequently, the generated summary can be rendered in the delineated space to provide the generated summary to the user. Some embodiments of block 460 comprise that an indication can be provided in the delineated space that the generated summary is still loading before the generated summary is rendered in the delineated space. For example, in some implementations, the search engine provides a loading bar via a UI element while the generated summary is generated before the generated summary is rendered on the UI of the search engine. As another example, in some implementations, the search engine provides an extracted key phrase (e.g., via a deep learning model or other machine learning model with lower latency than the language model used to generate the generated summary) while the generated summary is generated before the generated summary is rendered on the UI of the search engine.

Embodiments of block 460 may be carried out using search engine 215 (FIG. 2), search query input component 230, search results component 240 (FIG. 2), snippet component 250 (FIG. 2), prompt generation component 260 (FIG. 2), presentation component 270 (FIG. 2), and/or fine-tuning component 290 (FIG. 2), in some implementations. Additional details of embodiments of block 460, or for carrying out operations of block 460, are described in connection to FIG. 2, and in particular search engine 215, search query input component 230, search results component 240, snippet component 250, prompt generation component 260, presentation component 270, and fine-tuning component 290. Moreover, examples of summaries generated based on input search queries according to some embodiments of block 460 are illustratively depicted in FIGS. 3A-3G and described further in connection with the drawings.

At block 470, method 400 includes storing the representation of the summary generated by the language model in cache associated with the query. Some embodiments of block 470 comprise that the generated summary provided in response to the user's input search query is cached in order to provide the generated summary in response to similar search queries in the future and/or for use in other application contexts (for example, various applications by Microsoft® may access generated summaries from input search queries into BING® by Microsoft®). For example, the generated summary is cached, along with the input search query, and provided in response to future input search queries that are semantically similar to the input search query that was used to generate the summary. Some embodiments of block 470 comprise that similarity between subsequent input search queries to previous input search queries that include a corresponding cached generated summary can be determined using semantic similarity or any other similarity technique. For example, Nearest Neighbor Index can be used to determine whether an input search query is above a threshold similarity to a previous input search query with a corresponding cached generated summary. In this regard, some embodiments of block 470 comprise that the cached generated summary can be rendered with the search results in the search engine UI as the cached generated summary can be provided in near real-time to a subsequent similar input search query. Some embodiments of block 470 comprise that summaries are generated by a language for historical search queries and cached (for example, immediately after receiving a search query and/or a threshold number of similar search queries, offline, and/or when the LLM cost is lower, such as non-peak times) using the snippets of information for each of the search results, or a subset of the most relevant search results. In this regard, the generated summary that uses the snippets of information for each of the search results, or a subset of the most relevant search results, is cached so that the generated summary can be provided in near real-time in response to a future input search query that is similar to the historical search query that was used to generate the generated summary. Some embodiments of block 470 comprise that the cached generated summary based on the input search queries may be updated periodically (for example, weekly) by generating a new generated summary.

Embodiments of block 470 may be carried out using search engine 215 (FIG. 2), search query input component 230, search results component 240 (FIG. 2), snippet component 250 (FIG. 2), prompt generation component 260 (FIG. 2), presentation component 270 (FIG. 2), summary caching component 280 (FIG. 2), and/or fine-tuning component 290 (FIG. 2), in some implementations. Additional details of embodiments of block 470, or for carrying out operations of block 470, are described in connection to FIG. 2, and in particular search engine 215, search query input component 230, search results component 240, snippet component 250, prompt generation component 260, presentation component 270, summary caching component 280, and fine-tuning component 290. Moreover, examples of summaries generated based on input search queries according to some embodiments of block 470 are illustratively depicted in FIGS. 3A-3G and described further in connection with the drawings.

With reference to FIG. 5, aspects of example process flow 500 are illustratively provided for programmatically generating a summary of search results by a language model based on the corresponding relevance of the search results to an input search query. In particular, example process flow 500 may be performed to generate a summary of search results in response to a search query or access a cached generated summary based on a previous search query, as described in connection with FIG. 2.

At block 510, method 500 includes receiving a search query. Some embodiments of block 510 comprise a user inputting a search query (for example, a user inputs a natural language question as the search query) into a search engine. In one embodiment, the UI is presented in a search engine application such as Bing® by Microsoft®.

Embodiments of block 510 may be carried out using search engine 215 (FIG. 2) and/or search query input component 230 (FIG. 2), in some implementations. Additional details of embodiments of block 510, or for carrying out operations of block 510, are described in connection to FIG. 2 and FIG. 4, and in particular search engine 215 and search query input component 230. Moreover, examples of input search queries according to some embodiments of block 510 are illustratively depicted in FIGS. 3A-3G and described further in connection with the drawings.

At block 520, method 500 includes determining whether the search query is similar to a prior cached search query. Some embodiments of block 520 comprise that similarity between the input search query to previous input search queries that include a corresponding cached generated summary can be determined using semantic similarity or any other similarity technique. For example, Nearest Neighbor Index can be used to determine whether an input search query is above a threshold similarity to a previous input search query with a corresponding cached generated summary.

Embodiments of block 520 may be carried out using search engine 215 (FIG. 2), search query input component 230, search results component 240 (FIG. 2), snippet component 250 (FIG. 2), prompt generation component 260 (FIG. 2), presentation component 270 (FIG. 2), summary caching component 280 (FIG. 2), and/or fine-tuning component 290 (FIG. 2), in some implementations. Additional details of embodiments of block 520, or for carrying out operations of block 520, are described in connection to FIG. 2 and FIG. 4, and in particular search engine 215, search query input component 230, search results component 240, snippet component 250, prompt generation component 260, presentation component 270, summary caching component 280, and fine-tuning component 290. Moreover, examples of summaries generated based on input search queries according to some embodiments of block 520 are illustratively depicted in FIGS. 3A-3G and described further in connection with the drawings.

At block 530, method 500 includes determining that the search query is not similar to a prior cached search query and generating a summary using a language model. Some embodiments of block 520 comprise embodiments described with respect to block 420 through block 450 of FIG. 4.

Embodiments of block 530 may be carried out using search engine 215 (FIG. 2), search query input component 230, search results component 240 (FIG. 2), snippet component 250 (FIG. 2), prompt generation component 260 (FIG. 2), presentation component 270 (FIG. 2), summary caching component 280 (FIG. 2), and/or fine-tuning component 290 (FIG. 2), in some implementations. Additional details of embodiments of block 530, or for carrying out operations of block 530, are described in connection to FIG. 2 and FIG. 4, and in particular search engine 215, search query input component 230, search results component 240, snippet component 250, prompt generation component 260, presentation component 270, summary caching component 280, and fine-tuning component 290. Moreover, examples of summaries generated based on input search queries according to some embodiments of block 530 are illustratively depicted in FIGS. 3A-3G and described further in connection with the drawings.

At block 540, method 500 includes providing a representation of the summary generated by the language model in response to the search query. Some embodiments of block 520 comprise embodiments described with respect to block 460 of FIG. 4.

Embodiments of block 540 may be carried out using search engine 215 (FIG. 2), search query input component 230, search results component 240 (FIG. 2), snippet component 250 (FIG. 2), prompt generation component 260 (FIG. 2), presentation component 270 (FIG. 2), summary caching component 280 (FIG. 2), and/or fine-tuning component 290 (FIG. 2), in some implementations. Additional details of embodiments of block 540, or for carrying out operations of block 540, are described in connection to FIG. 2 and FIG. 4, and in particular search engine 215, search query input component 230, search results component 240, snippet component 250, prompt generation component 260, presentation component 270, summary caching component 280, and fine-tuning component 290. Moreover, examples of summaries generated based on input search queries according to some embodiments of block 540 are illustratively depicted in FIGS. 3A-3G and described further in connection with the drawings.

At block 550, method 500 includes determining that the search query is similar to a prior cached search query and accessing a representation of the summary from cache. Some embodiments of block 550 comprise that summaries are generated by a language for historical search queries and cached (for example, immediately after receiving a search query and/or a threshold number of similar search queries, offline, and/or when the LLM cost is lower, such as non-peak times) using the snippets of information for each of the search results, or a subset of the most relevant search results. In this regard, the generated summary that uses the snippets of information for each of the search results, or a subset of the most relevant search results, is cached so that the generated summary can be provided in near real-time in response to a future input search query that is similar to the historical search query that was used to generate the generated summary. Some embodiments of block 550 comprise that the cached generated summary based on the input search queries may be updated periodically (for example, weekly) by generating a new generated summary.

Embodiments of block 550 may be carried out using search engine 215 (FIG. 2), search query input component 230, search results component 240 (FIG. 2), snippet component 250 (FIG. 2), prompt generation component 260 (FIG. 2), presentation component 270 (FIG. 2), summary caching component 280 (FIG. 2), and/or fine-tuning component 290 (FIG. 2), in some implementations. Additional details of embodiments of block 550, or for carrying out operations of block 550, are described in connection to FIG. 2 and FIG. 4, and in particular search engine 215, search query input component 230, search results component 240, snippet component 250, prompt generation component 260, presentation component 270, summary caching component 280, and fine-tuning component 290. Moreover, examples of summaries generated based on input search queries according to some embodiments of block 550 are illustratively depicted in FIGS. 3A-3G and described further in connection with the drawings.

At block 560, method 500 includes providing the representation of the summary from cache in response to the query. Some embodiments of block 550 comprise that the cached generated summary can be rendered with the search results in the search engine UI as the cached generated summary can be provided in near real-time to a subsequent similar input search query.

Embodiments of block 560 may be carried out using search engine 215 (FIG. 2), search query input component 230, search results component 240 (FIG. 2), snippet component 250 (FIG. 2), prompt generation component 260 (FIG. 2), presentation component 270 (FIG. 2), summary caching component 280 (FIG. 2), and/or fine-tuning component 290 (FIG. 2), in some implementations. Additional details of embodiments of block 560, or for carrying out operations of block 560, are described in connection to FIG. 2 and FIG. 4, and in particular search engine 215, search query input component 230, search results component 240, snippet component 250, prompt generation component 260, presentation component 270, summary caching component 280, and fine-tuning component 290. Moreover, examples of summaries generated based on input search queries according to some embodiments of block 560 are illustratively depicted in FIGS. 3A-3G and described further in connection with the drawings.

Accordingly, we have described various aspects of technology directed to systems and methods for intelligently processing and presenting, on a computing device, a generated summary of search results based on the corresponding relevance of the search results to an input search query. It is understood that various features, sub-combinations, and modifications of the embodiments described herein are of utility and may be employed in other embodiments without reference to other features or sub-combinations. Moreover, the order and sequences of steps shown in the example methods 400 and 500 are not meant to limit the scope of the present disclosure in any way, and in fact, the steps may occur in a variety of different sequences within embodiments hereof. Such variations and combinations thereof are also contemplated to be within the scope of embodiments of this disclosure.

Other Embodiments

In some embodiments, a computerized system for preserving computing and network resources for search queries is provided, such as the computerized system described in any of the embodiments above. The computerized system comprises at least one processor, and computer memory storing computer-readable instructions, that, when executed by the at least one processor, cause the at least one processor to perform operations. The operations comprise determining, based on a search query, a plurality of snippets of search results relevant to the search query. The operations may further comprise generating, based on applying the plurality of snippets and the search query to a language model, a summary of the plurality of snippets. The operations may further comprise causing presentation of a user interface in response to the search query by rendering a portion of the user interface providing search results to the search query before rendering a different portion of the user interface providing a representation of the summary. Advantageously, these and other embodiments, as described herein, improve existing computing technologies by providing new or improved functionality in computing applications, including automated computing technology for programmatically generating summaries of search results by a language model based on the corresponding relevance of the search results to a live search query, as provided herein, can be beneficial for enabling improved computing applications and an improved user computing experience. For example, automated computing technology for programmatically generating summaries by a language model of search results based on the corresponding relevance of the search results to a live search query reduces the computing and networking resources utilized during conducting search queries through a search engine by facilitating a generated summary of the relevant search results so that the user is not required to manually identify, access, process, and review data for each of the search results of each of the search queries. In this regard, the computing and network resources are conserved. Further, embodiments of this disclosure address a need that arises from a very large scale of operations created by software-based services that cannot be managed by humans. The actions/operations described herein are not a mere use of a computer, but address results of a system that is a direct consequence of software used as a service offered in conjunction with search engines through services hosted across a variety of platforms and devices. Further still, embodiments of this disclosure enable an improved user experience across a number of computer devices, applications, and platforms. Further still, embodiments described herein enable certain data in response to search queries to be programmatically determined and presented without requiring computer tools and resources for a user to manually perform operations to produce this outcome. In this way, some embodiments, as described herein, reduce or eliminate a need for certain databases, data storage, and computer controls for enabling manually performed steps by an administrator, or the user themselves, to search, identify, assess, and configure (e.g., by hard-coding) specific, static data, thereby reducing the consumption of computing resources.

In any combination of the above embodiments of the system, the representation of the summary comprises a list of items, and each of the plurality of snippets comprises at least one of extracted text data from a corresponding search result, extracted image data from the corresponding search result, metadata associated with the corresponding search result, and a generative summary based on the corresponding search result.

In any combination of the above embodiments of the system, determining the plurality of snippets of search results further comprises: determining, based on the search query, a plurality of search results, each of the plurality of search results comprising at least one of a website, image, video and document; ranking, based on relevance to the search query, the plurality of search results; determining, from the plurality of search results, a set of search results above a threshold ranking; and extracting each of the plurality of snippets from a corresponding search result of the set of search results.

In any combination of the above embodiments of the system, determining the plurality of snippets of search results further comprises: determining, based on the search query, a plurality of search results, each of the plurality of search results comprising at least one of a website, image, video and document; ranking, based on relevance to the search query, the plurality of search results; determining, from the plurality of search results, a set of search results above a threshold ranking; determining, based on applying the set of search results to a transformer encoder model, a subset of the set of search results above a threshold likelihood of providing an answer to the search query; and extracting each of the plurality of snippets from a corresponding search result of the subset of the set of search results.

In any combination of the above embodiments of the system, generating the summary further comprises: determining a source of a portion of the summary based on a corresponding one of the plurality of snippets; and causing presentation of the representation of the summary further comprises: providing a citation to a search result corresponding to the one of the plurality of snippets of search results in a location of the portion of the summary in the representation of the summary.

In any combination of the above embodiments of the system, causing presentation of the user interface further comprises: providing the representation of the summary in a delineated space of the user interface; and providing at least one search result corresponding to one of the plurality of snippets of search results in the delineated space beneath the summary.

In any combination of the above embodiments of the system, the operations further comprising: caching the representation of the summary and the search query in a database; and in response to a subsequent search query within a threshold similarity to the search query, causing presentation of the representation of the summary in response to the subsequent search query.

In any combination of the above embodiments of the system, the operations further comprising: responsive to a hover action over a portion of the representation of the summary, causing presentation of a source of the portion of the representation of the summary.

In some embodiments, a computer-implemented method for preserving computing and network resources for search queries is provided. The method comprises generating, based on applying a search query and a plurality of snippets of search results relevant to the search query to a language model, a summary of the plurality of snippets. The method further comprises causing presentation of a user interface in response to the search query by rendering a portion of the user interface providing search results to the search query before rendering a different portion of the user interface providing the summary. The method further comprises caching the summary and the search query. The method further comprises causing presentation of a representation of the summary in response to a subsequent search query by accessing the summary from cache based on the subsequent search query being within a threshold similarity to the search query. Advantageously, these and other embodiments, as described herein, improve existing computing technologies by providing new or improved functionality in computing applications, including automated computing technology for programmatically generating summaries of search results by a language model based on the corresponding relevance of the search results to a live search query, as provided herein, can be beneficial for enabling improved computing applications and an improved user computing experience. For example, automated computing technology for programmatically generating summaries by a language model of search results based on the corresponding relevance of the search results to a live search query reduces the computing and networking resources utilized during conducting search queries through a search engine by facilitating a generated summary of the relevant search results so that the user is not required to manually identify, access, process, and review data for each of the search results of each of the search queries. In this regard, the computing and network resources are conserved. Further, embodiments of this disclosure address a need that arises from a very large scale of operations created by software-based services that cannot be managed by humans. The actions/operations described herein are not a mere use of a computer, but address results of a system that is a direct consequence of software used as a service offered in conjunction with search engines through services hosted across a variety of platforms and devices. Further still, embodiments of this disclosure enable an improved user experience across a number of computer devices, applications, and platforms. Further still, embodiments described herein enable certain data in response to search queries to be programmatically determined and presented without requiring computer tools and resources for a user to manually perform operations to produce this outcome. In this way, some embodiments, as described herein, reduce or eliminate a need for certain databases, data storage, and computer controls for enabling manually performed steps by an administrator, or the user themselves, to search, identify, assess, and configure (e.g., by hard-coding) specific, static data, thereby reducing the consumption of computing resources.

In any combination of the above embodiments of the method, each of the plurality of snippets comprises at least one of extracted text data from a corresponding search result, extracted image data from the corresponding search result, metadata associated with the corresponding search result, and a generative summary based on the corresponding search result.

In any combination of the above embodiments of the method, the method further comprises determining the plurality of snippets of search results relevant to the search query by: determining, based on the search query, a plurality of search results, each of the plurality of search results comprising at least one of a website, image, video and document; ranking, based on relevance to the search query, the plurality of search results; determining, from the plurality of search results, a set of search results above a threshold ranking; and extracting each of the plurality of snippets from a corresponding search result of the set of search results.

In any combination of the above embodiments of the method, the method further comprises determining the plurality of snippets of search results relevant to the search query by: determining, based on the search query, a plurality of search results, each of the plurality of search results comprising at least one of a website, image, video and document; ranking, based on relevance to the search query, the plurality of search results; determining, from the plurality of search results, a set of search results above a threshold ranking; determining, based on applying the set of search results to a machine learning model, a subset of the set of search results above a threshold likelihood providing an answer to the search query; and extracting each of the plurality of snippets from a corresponding search result of the subset of the set of search results.

In any combination of the above embodiments of the method, generating the summary further comprises: determining a source of a portion of the summary based on a corresponding one of the plurality of snippets; and causing presentation of the representation of the summary further comprises: providing a citation to a search result corresponding to the one of the plurality of snippets of search results in a location of the portion of the summary in the representation of the summary.

In any combination of the above embodiments of the method, causing presentation of the representation of the summary further comprises: providing the representation of the summary in a delineated space on a user interface; and providing at least one search result corresponding to one of the plurality of snippets of search results in the delineated space beneath the summary.

In any combination of the above embodiments of the method, the method further comprises updating the summary in cache periodically by: generating, based on applying the search query and a different plurality of snippets of search results relevant to the search query to the language model, an updated summary of the plurality of snippets.

In some embodiments, one or more computer storage media having computer-executable instructions embodied thereon that, when executed by a computing system having at least one processor and at least one memory, cause the at least one processor to perform operations. The operations comprise determining, based on a search query, a plurality of snippets of search results relevant to the search query. The operation may further comprise generating, based on applying the plurality of snippets and the search query to a language model, a summary of the plurality of snippets. The operation may further comprise causing presentation of a user interface in response to the search query by rendering a portion of the user interface providing search results to the search query before rendering a different portion of the user interface providing a representation of the summary. Advantageously, these and other embodiments, as described herein, improve existing computing technologies by providing new or improved functionality in computing applications, including automated computing technology for programmatically generating summaries of search results by a language model based on the corresponding relevance of the search results to a live search query, as provided herein, can be beneficial for enabling improved computing applications and an improved user computing experience. For example, automated computing technology for programmatically generating summaries by a language model of search results based on the corresponding relevance of the search results to a live search query reduces the computing and networking resources utilized during conducting search queries through a search engine by facilitating a generated summary of the relevant search results so that the user is not required to manually identify, access, process, and review data for each of the search results of each of the search queries. In this regard, the computing and network resources are conserved. Further, embodiments of this disclosure address a need that arises from a very large scale of operations created by software-based services that cannot be managed by humans. The actions/operations described herein are not a mere use of a computer, but address results of a system that is a direct consequence of software used as a service offered in conjunction with search engines through services hosted across a variety of platforms and devices. Further still, embodiments of this disclosure enable an improved user experience across a number of computer devices, applications, and platforms. Further still, embodiments described herein enable certain data in response to search queries to be programmatically determined and presented without requiring computer tools and resources for a user to manually perform operations to produce this outcome. In this way, some embodiments, as described herein, reduce or eliminate a need for certain databases, data storage, and computer controls for enabling manually performed steps by an administrator, or the user themselves, to search, identify, assess, and configure (e.g., by hard-coding) specific, static data, thereby reducing the consumption of computing resources.

In any combination of the above embodiments, each of the plurality of snippets comprises at least one of extracted text data from a corresponding search result, extracted image data from the corresponding search result, metadata associated with the corresponding search result, and a generative summary based on the corresponding search result.

In any combination of the above embodiments, determining the plurality of snippets of search results further comprises: determining, based on the search query, a plurality of search results, each of the plurality of search results comprising at least one of a website, image, video and document; ranking, based on relevance to the search query, the plurality of search results; determining, from the plurality of search results, a set of search results above a threshold ranking; and extracting each of the plurality of snippets from a corresponding search result of the set of search results.

In any combination of the above embodiments, determining the plurality of snippets of search results further comprises: determining, based on the search query, a plurality of search results, each of the plurality of search results comprising at least one of a website, image, video and document; ranking, based on relevance to the search query, the plurality of search results; determining, from the plurality of search results, a set of search results above a threshold ranking; determining, based on applying the set of search results to a machine learning model, a subset of the set of search results above a threshold likelihood providing an answer to the search query; and extracting each of the plurality of snippets from a corresponding search result of the subset of the set of search results.

In any combination of the above embodiments, generating the summary further comprises: determining a source of a portion of the summary based on a corresponding one of the plurality of snippets; and causing presentation of the representation of the summary further comprises: providing a citation to a search result corresponding to the one of the plurality of snippets of search results in a location of the portion of the summary in the representation of the summary.

Example Computing Environments

Having described various implementations, several example computing environments suitable for implementing embodiments of the disclosure are now described, including an example computing device and an example distributed computing environment in FIGS. 8 and 9, respectively. With reference to FIG. 6, an exemplary computing device is provided and referred to generally as computing device 600. The computing device 600 is but one example of a suitable computing environment and is not intended to suggest any limitation as to the scope of use or functionality of embodiments of the disclosure. Neither should the computing device 600 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Some embodiments may comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating to, for example, logic, control, and memory operations. Low level software written in machine code can provide more complex functionality to higher levels of software. Accordingly, in some embodiments, computer-executable instructions may include any software, including low level software written in machine code, higher level software such as application software, and any combination thereof. In this regard, the system components can manage resources and provide services for system functionality. Any other variations and combinations thereof are contemplated with the embodiments of the present disclosure.

Figure 6:
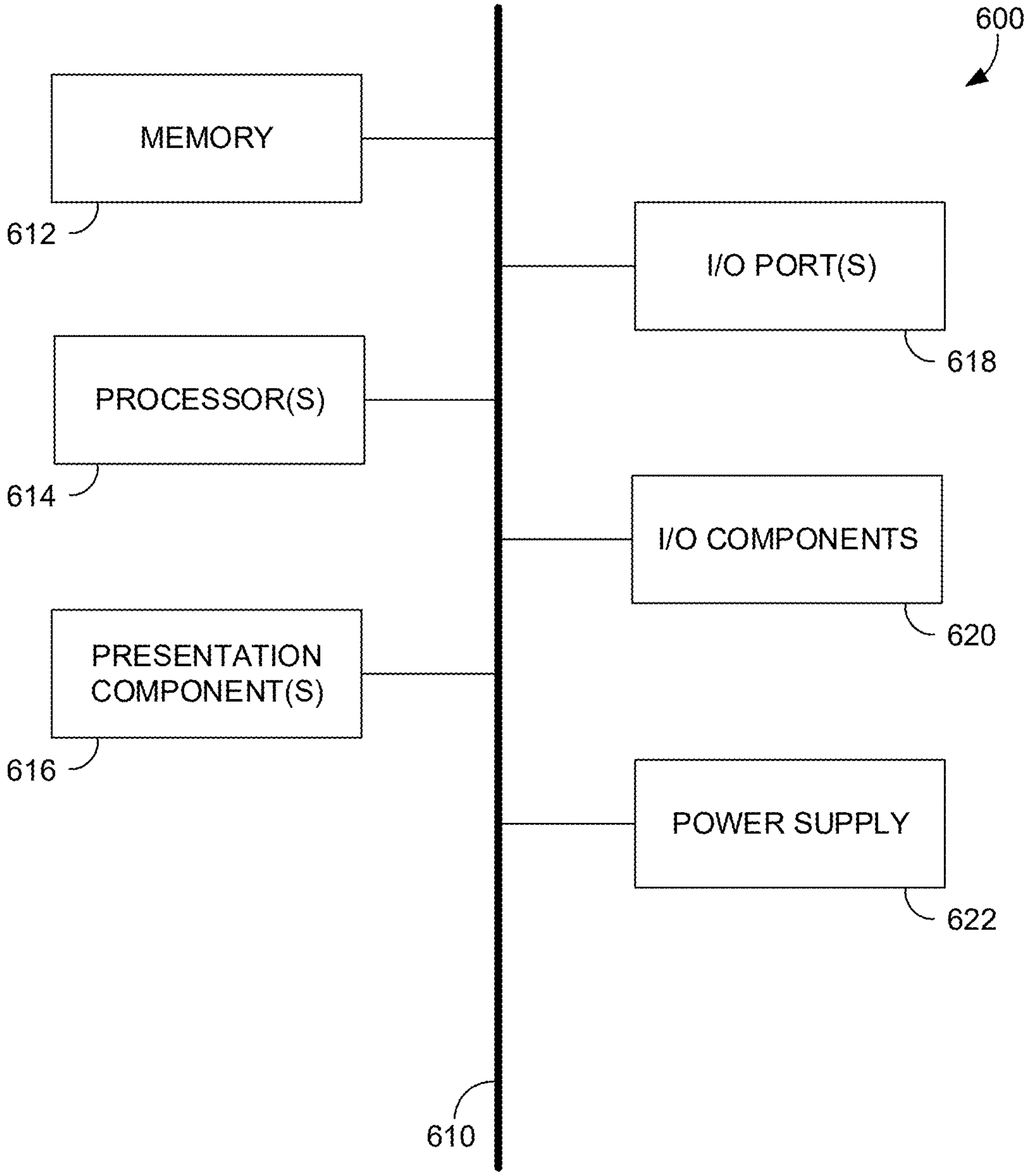
FIG. 6 is a block diagram of an example computing environment suitable for use in implementing an embodiment of the present disclosure.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more buses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present disclosure. Distinction is not made between such categories as "workstation," "server," "laptop," or "handheld device," as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include, for example, solid-state memory, hard drives, and optical-disc drives. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, or a wireless device. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 824 (or similar wireless communication components). The radio transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (for example, a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Figure 7:
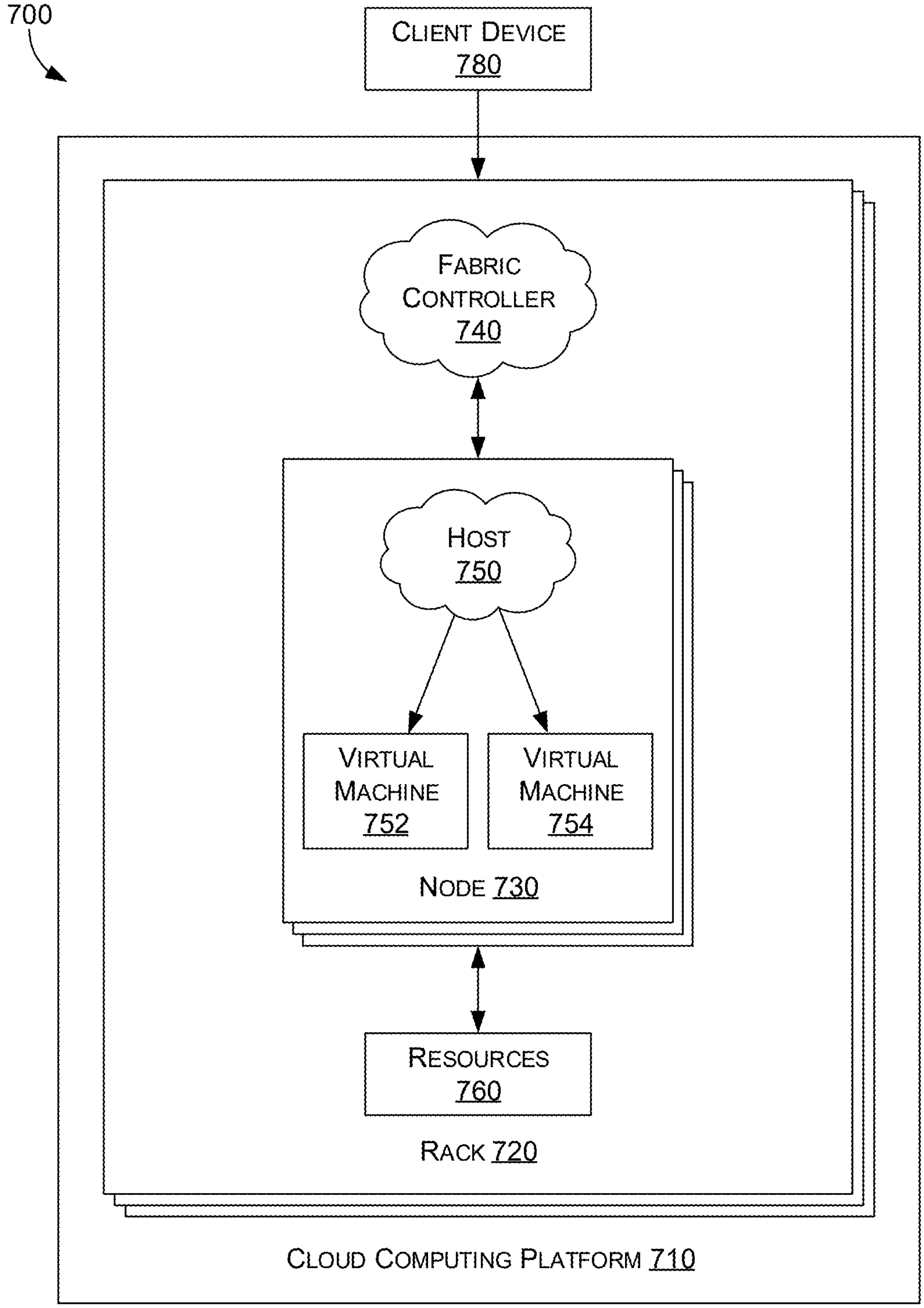
FIG. 7 is a block diagram of an example computing environment suitable for use in implementing an embodiment of the present disclosure.

Referring now to FIG. 7, an example distributed computing environment 700 is illustratively provided, in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location.

Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710, which runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a multi-tenant infrastructure or tenancy. The terms "service application," "application," or "service" are used interchangeably with regards to FIG. 7, and broadly refer to any software, or portions of software, that run on top of, or access storage and computing device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device, referred to as a cluster. Each server in the cluster can be implemented as a node.

Client device 780 may be linked to a service application in cloud computing platform 710. Client device 780 may be any type of computing device, such as user device 102*n* described with reference to FIG. 1, and the client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "of" includes the conjunctive, the disjunctive, and both (a or b thus includes either a or b, as well as a and b).

For purposes of a detailed discussion above, embodiments of the present invention are described with reference to a computing device or a distributed computing environment; however the computing device and distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and subcombinations and are contemplated within the scope of the claims.

The invention claimed is:

1. A computerized system for preserving computing and network resources for search queries, comprising:

at least one processor; and computer memory storing computer-useable instructions that, when executed by the at least one processor, cause the at least one processor to perform operations comprising:

determining a set of search results responsive to a search query;

extracting a plurality of snippets from a threshold amount of high relevance search results from the set of search results by:

determining a maximum token size of a snippet based on a total number of snippets of the plurality of snippets and processing speed of a large language model; and extracting each snippet of the plurality of snippets within the maximum token size and based on relevance to the search query;

determining, using a language model, a high relevance portion of snippets from the plurality of snippets, wherein the language model qualifies the high relevance portion of the plurality of snippets as having above a threshold likelihood of providing an answer to the search query;

generating, based on applying the high relevance portion of snippets and the search query to the large language model, a summary of the high relevance portion of snippets; and causing presentation of a user interface in response to the search query by causing rendering of a portion of the user interface providing the set of search results to the search query before rendering of a different portion of the user interface providing a representation of the summary when latency in providing the representation of the summary is above a threshold amount of time.

2. The computerized system of claim 1, wherein the representation of the summary comprises a list of items and wherein each of the plurality of snippets comprises at least one of extracted text data from a corresponding search result, extracted image data from the corresponding search result, metadata associated with the corresponding search result, and a generative summary based on the corresponding search result.

3. The computerized system of claim 1, wherein causing presentation of the user interface further comprises:

providing an indication that the summary is still loading when causing rendering of the portion of the user interface providing the set of search results to the search query before rendering of the different portion of the user interface providing the representation of the summary.

4. The computerized system of claim 1, wherein generating the summary further comprises:

generating an input prompt for the language model, the input prompt including the high relevance portion of snippets, a corresponding representation of the search query, and an instruction for the language model to generate the summary using the high relevance portion of snippets and the search query;

receiving an output of the language model in response to providing the input prompt to the language model; and determining the summary from the output of the language model.

5. The computerized system of claim 4, wherein generating the summary further comprises:

determining a source of a corresponding portion of the summary based on a corresponding one of the high relevance portion of snippets; and wherein causing presentation of the representation of the summary further comprises: providing a citation to a search result corresponding to the corresponding one of the high relevance portion of snippets in the representation of the summary.

6. The computerized system of claim 1, wherein causing presentation of the user interface further comprises:

providing the representation of the summary in a delineated space of the user interface; and providing at least one search result corresponding to one of the plurality of snippets in the delineated space beneath the summary.

7. The computerized system of claim 1, the operations further comprising:

caching the representation of the summary and the search query; and in response to a subsequent search query within a threshold similarity to the search query, causing presentation of the representation of the summary from cache in response to the subsequent search query by causing rendering of the different portion of the user interface providing the representation of the summary from the cache in near real-time with the portion of the user interface providing corresponding search results.

8. The computerized system of claim 1, the operations further comprising:

responsive to a hover action over a corresponding portion of the representation of the summary, causing presentation of a source of the corresponding portion of the representation of the summary.

9. A computer-implemented method for preserving computing and network resources for search queries, comprising:

determining a set of search results responsive to a search query;

extracting a plurality of snippets from a threshold amount of high relevance search results from the set of search results by:

determining a maximum token size of a snippet based on a total number of snippets of the plurality of snippets and processing speed of a language model; and extracting each snippet of the plurality of snippets within the maximum token size and based on relevance to the search query;

determining, using a transformer encoder model trained to qualify extracted snippets with respect to an input search query, a high relevance portion of snippets from the plurality of snippets, wherein the transformer encoder model qualifies the high relevance portion of the plurality of snippets as having above a threshold likelihood of providing an answer to the search query;

generating, based on applying the search query and the high relevance portion of snippets of search results to the language model, a summary of the high relevance portion of snippets;

causing presentation of a user interface in response to the search query by causing rendering of a portion of the user interface providing the set of search results to the search query before rendering of a different portion of the user interface providing the summary when latency in providing the summary is above a threshold amount of time;

caching the summary and the search query; and causing presentation of a representation of the summary in response to a subsequent search query by accessing the summary from cache based on the subsequent search query being within a threshold similarity to the search query and causing rendering of the different portion of the user interface providing the representation of the summary in near real-time with the portion of the user interface providing corresponding search results.

10. The computer-implemented method of claim 9, wherein each of the plurality of snippets comprises at least one of extracted text data from a corresponding search result, extracted image data from the corresponding search result, metadata associated with the corresponding search result, and a generative summary based on the corresponding search result.

11. The computer-implemented method of claim 9, wherein causing presentation of the user interface further comprises:

providing an indication that the summary is still loading when causing rendering of the portion of the user interface providing the set of search results to the search query before rendering of the different portion of the user interface providing the summary.

12. The computer-implemented method of claim 9, wherein generating the summary further comprises:

determining a source of a corresponding portion of the summary based on a corresponding one of the high relevance portion of snippets; and wherein causing presentation of the representation of the summary further comprises: providing a citation to a search result corresponding to the corresponding one of the high relevance portion of snippets in the representation of the summary.

13. The computer-implemented method of claim 9, wherein causing presentation of the representation of the summary further comprises:

providing the representation of the summary in a delineated space on the user interface; and providing at least one search result corresponding to one of the plurality of snippets in the delineated space beneath the summary.

14. The computer-implemented method of claim 9, further comprising:

updating the summary in the cache periodically by:

generating, based on applying the search query and a different plurality of snippets of search results relevant to the search query to the language model, an updated summary.

15. One or more computer storage media having computer-executable instructions embodied thereon that, when executed by a computing system having at least one processor and at least one memory, cause the at least one processor to perform operations comprising:

determining, based on a search query less than a threshold similarity to cached generated summaries, to generate a real-time summary of search results in response to the search query;

determining a set of search results responsive to the search query;

extracting a plurality of snippets from a threshold amount of high relevance search results from the set of search results by:

determining a maximum token size of a snippet based on a total number of snippets of the plurality of snippets and processing speed of a language model; and extracting each snippet of the plurality of snippets within the maximum token size and based on relevance to the search query;

determining, using a transformer model, a high relevance portion of snippets from the plurality of snippets, wherein the transformer model qualifies the high relevance portion of the plurality of snippets as having above a threshold likelihood of providing an answer to the search query;

generating, based on applying the high relevance portion of snippets and the search query to the language model, the real-time summary of search results; and causing presentation of a representation of the real-time summary of search results in response to the search query by causing rendering of a portion of a user interface providing the set of search results to the search query before rendering of a different portion of the user interface providing the representation of the real-time summary of search results when latency in providing the representation of the real-time summary of search results is above a threshold amount of time.

16. The one or more computer storage media of claim 15, wherein causing presentation of the user interface further comprises:

providing an indication that the real-time summary is still loading when causing rendering of the portion of the user interface providing the set of search results to the search query before rendering of the different portion of the user interface providing the representation of the real-time summary of search results.

17. The one or more computer storage media of claim 15, wherein generating the real-time summary further comprises:

determining a source of a corresponding portion of the real-time summary based on a corresponding one of the high relevance portion of snippets; and wherein causing presentation of the representation of the real-time summary further comprises: providing a citation to a search result corresponding to the corresponding one of the high relevance portion of snippets in the representation of the real-time summary.

* * * * *